(12) United States Patent
Liu et al.

(10) Patent No.: US 10,491,694 B2
(45) Date of Patent: Nov. 26, 2019

(54) METHOD AND SYSTEM FOR MEASURING USER ENGAGEMENT USING CLICK/SKIP IN CONTENT STREAM USING A PROBABILITY MODEL

(71) Applicant: Yahoo Holdings, Inc., Sunnyvale, CA (US)

(72) Inventors: Nathan Liu, Sunnyvale, CA (US); Scott Gaffney, Palo Alto, CA (US); Jean-Marc Langlois, Menlo Park, CA (US)

(73) Assignee: Oath Inc., New York, NY (US)

( * ) Notice: Subject to any disclaimer, the term of this patent is extended or adjusted under 35 U.S.C. 154(b) by 833 days.

(21) Appl. No.: 13/836,556

(22) Filed: Mar. 15, 2013

(65) Prior Publication Data

US 2014/0278308 A1 Sep. 18, 2014

(51) Int. Cl.

| | |
|---|---|
| *G06Q 30/02* | (2012.01) |
| *H04L 29/08* | (2006.01) |
| *H04N 21/234* | (2011.01) |
| *H04N 21/44* | (2011.01) |
| *H04N 21/442* | (2011.01) |
| *H04N 21/81* | (2011.01) |
| *G06Q 30/00* | (2012.01) |

(Continued)

(52) U.S. Cl.
CPC ............ *H04L 67/22* (2013.01); *G06Q 30/02* (2013.01); *G06Q 30/0251* (2013.01); *H04L 67/306* (2013.01); *H04N 21/23424* (2013.01); *H04N 21/44016* (2013.01); *H04N 21/44222* (2013.01); *H04N 21/812* (2013.01); *G06F 16/9577* (2019.01); *G06Q 30/00* (2013.01); *G06Q 30/0269* (2013.01); *G06Q 50/01* (2013.01)

(58) Field of Classification Search
None
See application file for complete search history.

(56) References Cited

U.S. PATENT DOCUMENTS

| | | |
|---|---|---|
| 5,416,700 A | 5/1995 | Bates |
| 5,616,876 A * | 4/1997 | Cluts ................. G06F 17/30749 348/E7.071 |

(Continued)

FOREIGN PATENT DOCUMENTS

EP 1650660 A2 4/2006

OTHER PUBLICATIONS

International Preliminary Report on Patentability dated Sep. 15, 2015 in International Application PCT/US2013/078372.

(Continued)

*Primary Examiner* — Kibrom K Gebresilassie
(74) *Attorney, Agent, or Firm* — Pillsbury Winthrop Shaw Pittman LLP

(57) ABSTRACT

Method, system, and programs for measuring user engagement. In one example, a model generated based on user activities with respect to a plurality pieces of content is obtained. One or more actual occurrences of the user activities with respect to one piece of the plurality pieces of content are identified. One or more future occurrences of the user activities with respect to the piece of content are estimated based on the model. A user engagement score with respect to the piece of content is calculated based on the one or more actual occurrences of the user activities and the one or more future occurrences of the user activities.

12 Claims, 30 Drawing Sheets

(51) Int. Cl.
  *G06Q 50/00* (2012.01)
  *G06F 16/957* (2019.01)

(56) References Cited

U.S. PATENT DOCUMENTS

| | | | | |
|---|---|---|---|---|
| 5,724,567 | A * | 3/1998 | Rose | G06F 17/30699 |
| | | | | 707/999.002 |
| 5,857,020 | A | 1/1999 | Peterson | |
| 6,085,226 | A * | 7/2000 | Horvitz | G06F 17/30902 |
| | | | | 707/E17.12 |
| 7,962,750 | B1 | 6/2011 | Gruse | |
| 8,095,580 | B2 | 1/2012 | Reddy et al. | |
| 8,447,852 | B1 | 5/2013 | Penumaka | |
| 8,451,832 | B2 | 5/2013 | Takai | |
| 8,620,967 | B2 | 12/2013 | Wessling | |
| 8,943,440 | B2 * | 1/2015 | Adderton | G06F 17/2235 |
| | | | | 345/173 |
| 8,949,250 | B1 * | 2/2015 | Garg | H04L 67/10 |
| | | | | 707/748 |
| 9,063,972 | B1 * | 6/2015 | Marra | G06F 17/3051 |
| 9,092,489 | B1 * | 7/2015 | Dasilva | G06F 17/3082 |
| 9,129,227 | B1 * | 9/2015 | Yee | G06N 99/005 |
| 9,300,617 | B2 * | 3/2016 | Hallerstrom Sjostedt | |
| | | | | H04L 51/22 |
| 9,348,496 | B2 * | 5/2016 | Lewis | G06F 3/0485 |
| 9,367,227 | B1 * | 6/2016 | Kim | G06F 3/04883 |
| 9,703,837 | B1 * | 7/2017 | Teng | G06Q 30/0202 |
| 9,736,105 | B2 * | 8/2017 | Sorg | G06Q 50/01 |
| 9,747,647 | B2 * | 8/2017 | Ruan | G06Q 50/01 |
| 10,133,811 | B2 * | 11/2018 | Noma | G06F 16/334 |
| 2001/0038393 | A1 | 11/2001 | Crain et al. | |
| 2002/0059094 | A1 * | 5/2002 | Hosea | H04N 21/25891 |
| | | | | 725/10 |
| 2002/0103789 | A1 * | 8/2002 | Turnbull | G06F 17/30867 |
| 2002/0184131 | A1 | 12/2002 | Weidmann | |
| 2003/0182437 | A1 * | 9/2003 | Kobayashi | H04L 29/06027 |
| | | | | 709/232 |
| 2004/0254957 | A1 * | 12/2004 | Hyotyniemi | G06F 17/30764 |
| 2006/0053077 | A1 | 3/2006 | Mourad et al. | |
| 2006/0112087 | A1 * | 5/2006 | Smyth | G06F 17/30876 |
| 2006/0242017 | A1 * | 10/2006 | Libes | G06Q 10/10 |
| | | | | 705/14.54 |
| 2007/0156887 | A1 * | 7/2007 | Wright | G06Q 30/02 |
| | | | | 709/224 |
| 2007/0239713 | A1 * | 10/2007 | Leblang | G06F 17/30864 |
| 2008/0155461 | A1 * | 6/2008 | Ozaki | G06F 3/0485 |
| | | | | 715/784 |
| 2008/0165150 | A1 * | 7/2008 | Kwon | G06F 3/04855 |
| | | | | 345/173 |
| 2008/0201242 | A1 | 8/2008 | Minnis | |
| 2009/0033619 | A1 | 2/2009 | Oh | |
| 2009/0063984 | A1 * | 3/2009 | Agarwal | G06Q 30/02 |
| | | | | 715/733 |
| 2009/0070151 | A1 | 3/2009 | Sellari | |
| 2009/0106082 | A1 * | 4/2009 | Senti | G06Q 30/02 |
| | | | | 705/7.33 |
| 2009/0268945 | A1 | 10/2009 | Wilson et al. | |
| 2010/0011017 | A1 | 1/2010 | Masato | |
| 2010/0106730 | A1 * | 4/2010 | Aminian | G06Q 30/02 |
| | | | | 707/748 |
| 2010/0106852 | A1 | 4/2010 | Kindig et al. | |
| 2010/0164863 | A1 * | 7/2010 | Tunick | G06F 3/147 |
| | | | | 345/156 |
| 2010/0191574 | A1 | 7/2010 | Ziemann | |
| 2010/0191631 | A1 | 7/2010 | Weidmann | |
| 2010/0205541 | A1 * | 8/2010 | Rapaport | G06Q 10/10 |
| | | | | 715/753 |
| 2010/0299135 | A1 * | 11/2010 | Fritsch | G06F 17/2785 |
| | | | | 704/9 |
| 2011/0004831 | A1 * | 1/2011 | Steinberg | H04N 21/454 |
| | | | | 715/753 |
| 2011/0107264 | A1 | 5/2011 | Akella | |
| 2011/0125577 | A1 * | 5/2011 | Song | G06Q 30/02 |
| | | | | 705/14.53 |
| 2011/0196865 | A1 * | 8/2011 | Eggink | G06F 17/30702 |
| | | | | 707/732 |
| 2011/0270672 | A1 * | 11/2011 | Hillard | G06Q 30/02 |
| | | | | 705/14.42 |
| 2011/0288913 | A1 * | 11/2011 | Waylonis | G06Q 30/02 |
| | | | | 705/14.4 |
| 2012/0004978 | A1 * | 1/2012 | Kothari | G06Q 30/02 |
| | | | | 705/14.42 |
| 2012/0036080 | A1 * | 2/2012 | Singer | G06Q 10/10 |
| | | | | 705/319 |
| 2012/0041907 | A1 * | 2/2012 | Wang | G06Q 30/02 |
| | | | | 706/12 |
| 2012/0054670 | A1 | 3/2012 | Rainisto | |
| 2012/0076469 | A1 * | 3/2012 | Hosoi | H04N 13/189 |
| | | | | 386/230 |
| 2012/0143790 | A1 * | 6/2012 | Wang | G06N 7/005 |
| | | | | 706/12 |
| 2012/0209961 | A1 * | 8/2012 | McCoy | H04N 21/4333 |
| | | | | 709/219 |
| 2012/0313977 | A1 | 12/2012 | Kwon | |
| 2013/0073473 | A1 * | 3/2013 | Heath | G06Q 30/02 |
| | | | | 705/319 |
| 2013/0179794 | A1 * | 7/2013 | Eastham | H04L 67/22 |
| | | | | 715/738 |
| 2013/0204859 | A1 * | 8/2013 | Vijaywargi | G06F 17/30867 |
| | | | | 707/709 |
| 2013/0212114 | A1 * | 8/2013 | Needham | G06F 17/30867 |
| | | | | 707/748 |
| 2013/0212460 | A1 * | 8/2013 | Balasubramanian | |
| | | | | G06F 16/9577 |
| | | | | 715/234 |
| 2014/0039875 | A1 * | 2/2014 | Hao | G06F 17/27 |
| | | | | 704/9 |
| 2014/0064711 | A1 | 3/2014 | Ziskind et al. | |
| 2014/0137074 | A1 | 5/2014 | Hey et al. | |
| 2014/0180761 | A1 * | 6/2014 | Yolles | G06Q 50/06 |
| | | | | 705/7.29 |
| 2014/0200999 | A1 * | 7/2014 | Canny | G06Q 30/0251 |
| | | | | 705/14.54 |
| 2014/0280548 | A1 * | 9/2014 | Langlois | H04L 67/306 |
| | | | | 709/204 |
| 2014/0280550 | A1 * | 9/2014 | Glass | H04L 67/22 |
| | | | | 709/204 |
| 2014/0280890 | A1 * | 9/2014 | Yi | H04L 67/22 |
| | | | | 709/224 |
| 2014/0351271 | A1 * | 11/2014 | Fairchild-Coppoletti | |
| | | | | G06F 17/30038 |
| | | | | 707/749 |
| 2014/0372415 | A1 * | 12/2014 | Fernandez-Ruiz | |
| | | | | G06F 16/9038 |
| | | | | 707/722 |
| 2015/0007101 | A1 * | 1/2015 | Lewis | G06F 3/0485 |
| | | | | 715/784 |
| 2015/0088598 | A1 * | 3/2015 | Acharyya | G06Q 30/00 |
| | | | | 705/7.29 |
| 2016/0021213 | A1 * | 1/2016 | Ruan | G06O 50/01 |
| | | | | 709/204 |
| 2016/0086219 | A1 * | 3/2016 | Richardson | G06F 16/9535 |
| | | | | 705/14.53 |
| 2016/0173560 | A1 * | 6/2016 | Datta | H04L 67/02 |
| | | | | 709/203 |
| 2016/0189210 | A1 * | 6/2016 | Lacey | G06Q 30/0261 |
| | | | | 705/7.31 |
| 2016/0373396 | A1 * | 12/2016 | Sorg | G06Q 50/01 |
| 2017/0364986 | A1 * | 12/2017 | Kim | G06Q 30/0625 |
| 2018/0075493 | A1 * | 3/2018 | Agarwal | G06Q 30/0275 |

OTHER PUBLICATIONS

International Search Report and Written Opinion dated Apr. 30, 2014 in International Application PCT/US2013/078372.
Office Action dated Apr. 2, 2019 in U.S. Appl. No. 13/836,758.
Office Action dated Jun. 7, 2018 in U.S. Appl. No. 13/836,758.
Office Action dated Oct. 3, 2018 in U.S. Appl. No. 13/836,758.
Office Action dated Feb. 14, 2017 in U.S. Appl. No. 13/836,758.

(56) References Cited

OTHER PUBLICATIONS

Office Action dated Jun. 13, 2017 in U.S. Appl. No. 13/836,758.
Office Action dated Nov. 9, 2017 in U.S. Appl. No. 13/836,758.
Office Action dated Aug. 16, 2016 in U.S. Appl. No. 13/836,758.
Office Action dated Feb. 26, 2015 in U.S. Appl. No. 13/836,758.
Office Action dated Jul. 29, 2015 in U.S. Appl. No. 13/836,758.
Office Action dated Dec. 14, 2015 in U.S. Appl. No. 13/836,758.
Office Action dated Oct. 10, 2019 in U.S. Appl. No. 13/836,758.

* cited by examiner

METHOD AND SYSTEM FOR MEASURING USER ENGAGEMENT USING CLICK/SKIP IN CONTENT STREAM USING A PROBABILITY MODEL

CROSS-REFERENCE TO RELATED APPLICATION

The present application is related to a U.S. patent application Ser. No. 13/836,208, filed on Mar. 15, 2013, entitled METHOD AND SYSTEM FOR MEASURING USER ENGAGEMENT FROM STREAM DEPTH, and a U.S. Patent application Ser. No. 13/836,758, filed on Mar. 15, 2013, entitled METHOD AND SYSTEM FOR MEASURING USER ENGAGEMENT USING SCROLL DWELL TIME, all of which are incorporated herein by reference in their entireties.

BACKGROUND

1. Technical Field

The present teaching relates to methods and systems for providing content. Specifically, the present teaching relates to methods and systems for providing online content.

2. Discussion of Technical Background

The Internet has made it possible for a user to electronically access virtually any content at anytime and from any location. With the explosion of information, it has become more and more important to provide users with information that is relevant to the user and not just information in general. Further, as users of today's society rely on the Internet as their source of information, entertainment, and/or social connections, e.g., news, social interaction, movies, music, etc, it is critical to provide users with information they find valuable.

Efforts have been made to attempt to allow users to readily access relevant and on the point content. For example, topical portals have been developed that are more subject matter oriented as compared to generic content gathering systems such as traditional search engines. Example topical portals include portals on finance, sports, news, weather, shopping, music, art, film, etc. Such topical portals allow users to access information related to subject matters that these portals are directed to. Users have to go to different portals to access content of certain subject matter, which is not convenient and not user centric.

Another line of efforts in attempting to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' declared interests and/or inferred from, e.g., users' demographics. There have also been systems that identify users' interests based on observations made on users' interactions with content. A typical example of such user interaction with content is click through rate (CTR).

These traditional approaches have various shortcomings. For example, users' interests are profiled without any reference to a baseline so that the level of interest can be more accurately estimated. User interests are detected in isolated application settings so that user profiling in individual applications cannot capture a broad range of the overall interests of a user. Such traditional approach to user profiling lead to fragmented representation of user interests without a coherent understanding of the users' preferences. Because profiles of the same user derived from different application settings are often grounded with respect to the specifics of the applications, it is also difficult to integrate them to generate a more coherent profile that better represent the user's interests.

User activities directed to content are traditionally observed and used to estimate or infer users' interests. CTR is the most commonly used measure to estimate users' interests. However, CTR is no longer adequate to capture users' interests particularly given that different types of activities that a user may perform on different types of devices may also reflect or implicate user's interests. In addition, user reactions to content usually represent users' short term interests. Such observed short term interests, when acquired piece meal, as traditional approaches often do, can only lead to reactive, rather than proactive, services to users. Although short term interests are important, they are not adequate to enable understanding of the more persistent long term interests of a user, which are crucial in terms of user retention. Most user interactions with content represent short term interests of the user so that relying on such short term interest behavior makes it difficult to expand the understanding of the increasing range of interests of the user. When this is in combination with the fact that such collected data is always the past behavior and collected passively, it creates a personalization bubble, making it difficult, if not impossible, to discover other interests of a user unless the user initiates some action to reveal new interests.

Yet another line of effort to allow users to access relevant content is to pooling content that may be interested by users in accordance with their interests. Given the explosion of information on the Internet, it is not likely, even if possible, to evaluate all content accessible via the Internet whenever there is a need to select content relevant to a particular user. Thus, realistically, it is needed to identify a subset or a pool of the Internet content based on some criteria so that content can be selected from this pool and recommended to users based on their interests for consumption.

Conventional approaches to creating such a subset of content are application centric. Each application carves out its own subset of content in a manner that is specific to the application. For example, Amazon.com may have a content pool related to products and information associated thereof created/updated based on information related to its own users and/or interests of such users exhibited when they interact with Amazon.com. Facebook also has its own subset of content, generated in a manner not only specific to Facebook but also based on user interests exhibited while they are active on Facebook. As a user may be active in different applications (e.g., Amazon.com and Facebook) and with each application, they likely exhibit only part of their overall interests in connection with the nature of the application. Given that, each application can usually gain understanding, at best, of partial interests of users, making it difficult to develop a subset of content that can be used to serve a broader range of users' interests.

Another line of effort is directed to personalized content recommendation, i.e., selecting content from a content pool based on the user's personalized profiles and recommending such identified content to the user. Conventional solutions focus on relevance, i.e., the relevance between the content and the user. Although relevance is important, there are other factors that also impact how recommendation content should be selected in order to satisfy a user's interests. Most content recommendation systems insert advertisement to content identified for a user for recommendation. Some traditional systems that are used to identify insertion advertisements match content with advertisement or user's query (also content) with advertisement, without considering matching based on demographics of the user with features of the target audience defined by advertisers. Some traditional systems match user profiles with the specified demographics of the target audience defined by advertisers but without matching the content to be provided to the user and the advertisement. The reason is that content is often classified into taxonomy based on subject matters covered in the content yet advertisement taxonomy is often based on desired target audience groups. This makes it less effective in terms of selecting the most relevant advertisement to be inserted into content to be recommended to a specific user.

There is a need for improvements over the conventional approaches to personalizing content recommendation.

SUMMARY

The present teaching relates to methods, systems, and programming for measuring user engagement. Particularly, the present teaching relates to methods, systems, and programming for measuring user engagement in personalized content recommendation.

In one example, a method, implemented on at least one machine each of which has at least one processor, storage, and a communication platform connected to a network for measuring user engagement, is disclosed. A model generated based on user activities with respect to a plurality pieces of content is obtained. One or more actual occurrences of the user activities with respect to one piece of the plurality pieces of content are identified. One or more future occurrences of the user activities with respect to the piece of content are estimated based on the model. A user engagement score with respect to the piece of content is calculated based on the one or more actual occurrences of the user activities and the one or more future occurrences of the user activities.

In a different example, a system for measuring user engagement is disclosed. The system includes a model building unit, a user activity detection module, and a user engagement score calculation unit. The model building unit is configured to generate a model based on user activities with respect to a plurality pieces of content. The user activity detection module is configured to identify one or more actual occurrences of the user activities with respect to one piece of the plurality pieces of content. The user engagement score calculation unit is configured to estimate one or more future occurrences of the user activities with respect to the piece of content based on the model. The user engagement score calculation unit is also configured to calculate a user engagement score with respect to the piece of content based on the one or more actual occurrences of the user activities and the one or more future occurrences of the user activities.

Other concepts relate to software for measuring user engagement. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for measuring user engagement, wherein the information, when read by the machine, causes the machine to perform a series of steps. A model is generated based on user activities with respect to a plurality pieces of content. One or more actual occurrences of the user activities with respect to one piece of the plurality pieces of content are identified. One or more future occurrences of the user activities with respect to the piece of content are estimated based on the model. A user engagement score with respect to the piece of content is calculated based on the one or more actual occurrences of the user activities and the one or more future occurrences of the user activities.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
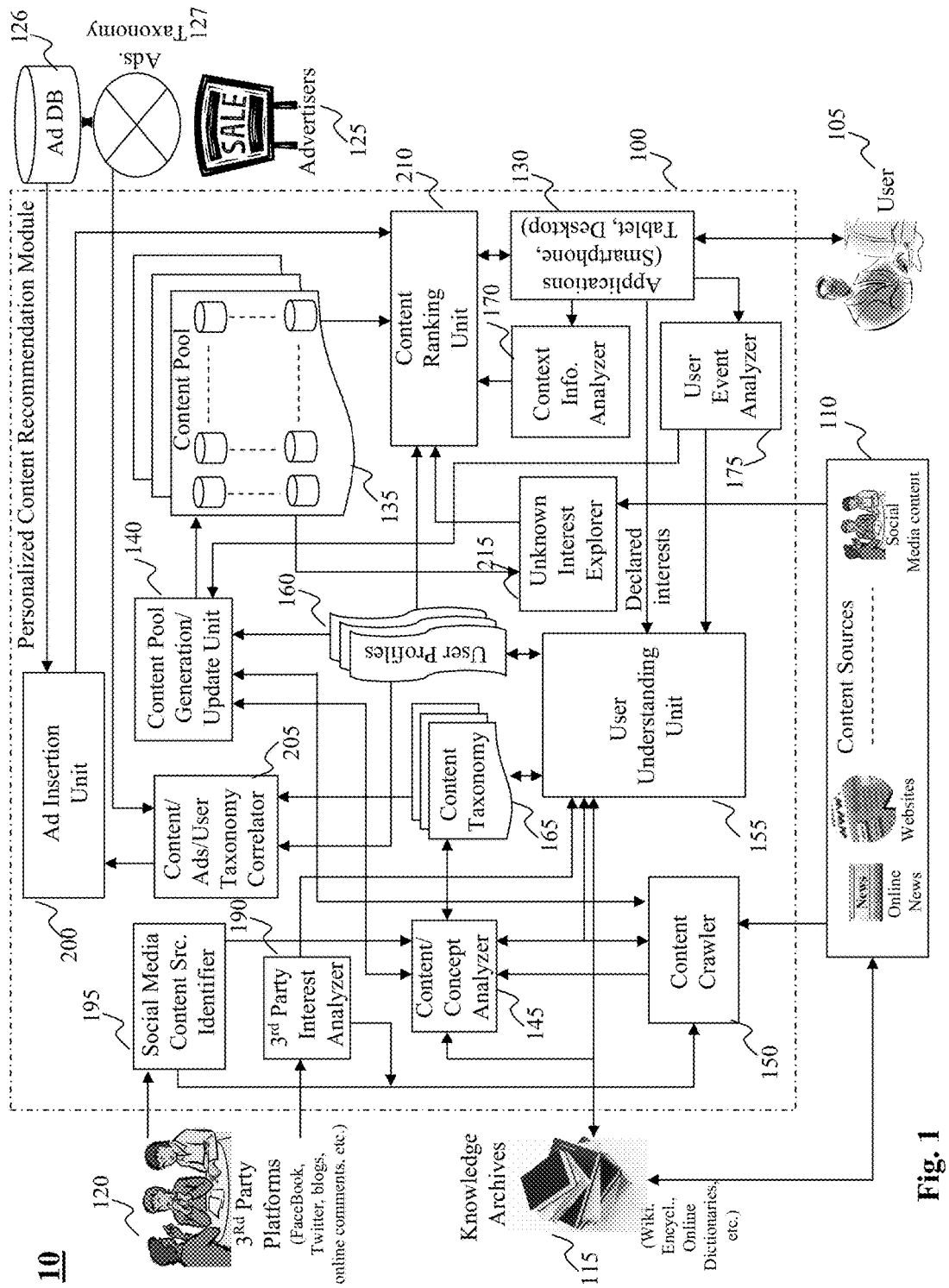
FIG. 1 depicts an exemplary system diagram for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to personalizing on-line content recommendations to a user. Particularly, the present teaching relates to a system, method, and/or programs for personalized content recommendation that addresses the shortcomings associated the conventional content recommendation solutions in personalization, content pooling, and recommending personalized content.

With regard to personalization, the present teaching identifies a user's interests with respect to a universal interest space, defined via known concept archives such as Wikipedia and/or content taxonomy. Using such a universal interest space, interests of users, exhibited in different applications and via different platforms, can be used to establish a general population's profile as a baseline against which individual user's interests and levels thereof can be determined. For example, users active in a third party application such as Facebook or Twitter and the interests that such users exhibited in these third party applications can be all mapped to the universal interest space and then used to compute a baseline interest profile of the general population. Specifically, each user's interests observed with respect to each document covering certain subject matters or concepts can be mapped to, e.g., Wikipedia or certain content taxonomy. A high dimensional vector can be constructed based on the universal interest space in which each attribute of the vector corresponds to a concept in the universal space and the value of the attribute may corresponds to an evaluation of the user's interest in this particular concept. The general baseline interest profile can be derived based on all vectors represent the population. Each vector representing an individual can be normalized against the baseline interest profile so that the relative level of interests of the user with respect to the concepts in the universal interest space can be determined. This enables better understanding of the level of interests of the user in different subject matters with respect to a more general population and result in enhanced personalization for content recommendation. Rather than characterizing users' interests merely according to proprietary content taxonomy, as is often done in the prior art, the present teaching leverages public concept archives, such as Wikipedia or online encyclopedia, to define a universal interest space in order to profile a user's interests in a more coherent manner. Such a high dimensional vector captures the entire interest space of every user, making person-to-person comparison as to personal interests more effective. Profiling a user and in this manner also leads to efficient identification of users who share similar interests. In addition, content may also be characterized in the same universal interest space, e.g., a high dimensional vector against the concepts in the universal interest space can also be constructed with values in the vector indicating whether the content covers each of the concepts in the universal interest space. By characterizing users and content in the same space in a coherent way, the affinity between a user and a piece of content can be determined via, e.g., a dot product of the vector for the user and the vector for the content.

The present teaching also leverages short term interests to better understand long term interests of users. Short term interests can be observed via user online activities and used in online content recommendation, the more persistent long term interests of a user can help to improve content recommendation quality in a more robust manner and, hence, user retention rate. The present teaching discloses discovery of long term interests as well as short term interests.

To improve personalization, the present teaching also discloses ways to improve the ability to estimate a user's interest based on a variety of user activities. This is especially useful because meaningful user activities often occur in different settings, on different devices, and in different operation modes. Through such different user activities, user engagement to content can be measured to infer users' interests. Traditionally, clicks and click through rate (CTR) have been used to estimate users' intent and infer users' interests. CTR is simply not adequate in today's world. Users may dwell on a certain portion of the content, the dwelling may be for different lengths of time, users may scroll along the content and may dwell on a specific portion of the content for some length of time, users may scroll down at different speeds, users may change such speed near certain portions of content, users may skip certain portion of content, etc. All such activities may have implications as to users' engagement to content. Such engagement can be utilized to infer or estimate a user's interests. The present teaching leverages a variety of user activities that may occur across different device types in different settings to achieve better estimation of users' engagement in order to enhance the ability of capturing a user's interests in a more reliable manner.

Another aspect of the present teaching with regard to personalization is its ability to explore unknown interests of a user by generating probing content. Traditionally, user profiling is based on either user provided information (e.g., declared interests) or passively observed past information such as the content that the user has viewed, reactions to such content, etc. Such prior art schemes can lead to a personalization bubble where only interests that the user revealed can be used for content recommendation. Because of that, the only user activities that can be observed are directed to such known interests, impeding the ability to understand the overall interest of a user. This is especially so considering the fact that users often exhibit different interests (mostly partial interests) in different application settings. The present teaching discloses ways to generate probing content with concepts that is currently not recognized as one of the user's interests in order to explore the user's unknown interests. Such probing content is selected and recommended to the user and user activities directed to the probing content can then be analyzed to estimate whether the user has other interests. The selection of such probing content may be based on a user's current known interests by, e.g., extrapolating the user's current interests. For example, for some known interests of the user (e.g., the short term interests at the moment), some probing concepts in the universal interest space, for which the user has not exhibited interests in the past, may be selected according to some criteria (e.g., within a certain distance from the user's current known interest in a taxonomy tree) and content related to such probing concepts may then be selected and recommended to the user. Another way to identify probing concept (corresponding to unknown interest of the user) may be through the user's cohorts. For instance, a user may share certain interests with his/her cohorts but some members of the circle may have some interests that the user has never exhibited before. Such un-shared interests with cohorts may be selected as probing unknown interests for the user and content related to such probing unknown interests may then be selected as probing content to be recommended to the user. In this manner, the present teaching discloses a scheme by which a user's interests can be continually probed and understood to improve the quality of personalization. Such managed probing can also be combined with random selection of probing content to allow discovery of unknown interests of the user that are far removed from the user's current known interests.

A second aspect of recommending quality personalized content is to build a content pool with quality content that covers subject matters interesting to users. Content in the content pool can be rated in terms of the subject and/or the performance of the content itself. For example, content can be characterized in terms of concepts it discloses and such a characterization may be generated with respect to the universal interest space, e.g., defined via concept archive(s) such as content taxonomy and/or Wikipedia and/or online encyclopedia, as discussed above. For example, each piece of content can be characterized via a high dimensional vector with each attribute of the vector corresponding to a concept in the interest universe and the value of the attribute indicates whether and/or to what degree the content covers the concept. When a piece of content is characterized in the same universal interest space as that for user's profile, the affinity between the content and a user profile can be efficiently determined.

Each piece of content in the content pool can also be individually characterized in terms of other criteria. For example, performance related measures, such as popularity of the content, may be used to describe the content. Performance related characterizations of content may be used in both selecting content to be incorporated into the content pool as well as selecting content already in the content pool for recommendation of personalized content for specific users. Such performance oriented characterizations of each piece of content may change over time and can be assessed periodically and can be done based on users' activities. Content pool also changes over time based on various reasons, such as content performance, change in users' interests, etc. Dynamically changed performance characterization of content in the content pool may also be evaluated periodically or dynamically based on performance measures of the content so that the content pool can be adjusted over time, i.e., by removing low performance content pieces, adding new content with good performance, or updating content.

To grow the content pool, the present teaching discloses ways to continually discover both new content and new content sources from which interesting content may be accessed, evaluated, and incorporated into the content pool. New content may be discovered dynamically via accessing information from third party applications which users use and exhibit various interests. Examples of such third party applications include Facebook, Twitter, Microblogs, or YouTube. New content may also be added to the content pool when some new interest or an increased level of interests in some subject matter emerges or is predicted based on the occurrence of certain (spontaneous) events. One example is the content about the life of Pope Benedict, which in general may not be a topic of interests to most users but likely will be in light of the surprising announcement of Pope Benedict's resignation. Such dynamic adjustment to the content pool aims at covering a dynamic (and likely growing) range of interests of users, including those that are, e.g., exhibited by users in different settings or applications or predicted in light of context information. Such newly discovered content may then be evaluated before it can be selected to be added to the content pool.

Certain content in the content pool, e.g., journals or news, need to be updated over time. Conventional solutions usually update such content periodically based on a fixed schedule. The present teaching discloses the scheme of dynamically determining the pace of updating content in the content pool based on a variety of factors. Content update may be affected by context information. For example, the frequency at which a piece of content scheduled to be updated may be every 2 hours, but this frequency can be dynamically adjusted according to, e.g., an explosive event such as an earthquake. As another example, content from a social group on Facebook devoted to Catholicism may normally be updated daily. When Pope Benedict's resignation made the news, the content from that social group may be updated every hour so that interested users can keep track of discussions from members of this social group. In addition, whenever there are newly identified content sources, it can be scheduled to update the content pool by, e.g., crawling the content from the new sources, processing the crawled content, evaluating the crawled content, and selecting quality new content to be incorporated into the content pool. Such a dynamically updated content pool aims at growing in compatible with the dynamically changing users' interests in order to facilitate quality personalized content recommendation.

Another key to quality personalized content recommendation is the aspect of identifying quality content that meets the interests of a user for recommendation. Previous solutions often emphasize mere relevance of the content to the user when selecting content for recommendation. In addition, traditional relevance based content recommendation was mostly based on short term interests of the user. This not only leads to a content recommendation bubble, i.e., known short interests cause recommendations limited to the short term interests and reactions to such short term interests centric recommendations cycle back to the short term interests that start the process. This bubble makes it difficult to come out of the circle to recommend content that can serve not only the overall interests but also long term interests of users. The present teaching combines relevance with performance of the content so that not only relevant but also quality content can be selected and recommended to users in a multi-stage ranking system.

In addition, to identify recommended content that can serve a broad range of interests of a user, the present teaching relies on both short term and long term interests of the user to identify user-content affinity in order to select content that meets a broader range of users' interests to be recommended to the user.

In content recommendation, monetizing content such as advertisements are usually also selected as part of the recommended content to a user. Traditional approaches often select ads based on content in which the ads are to be inserted. Some traditional approaches also rely on user input such as queries to estimate what ads likely can maximize the economic return. These approaches select ads by matching the taxonomy of the query or the content retrieved based on the query with the content taxonomy of the ads. However, content taxonomy is commonly known not to correspond with advertisement taxonomy, which advertisers use to target at certain audience. As such, selecting ads based on content taxonomy does not serve to maximize the economic return of the ads to be inserted into content and recommended to users. The present teaching discloses method and system to build a linkage between content taxonomy and advertisement taxonomy so that ads that are not only relevant to a user's interests but also the interests of advertisers can be selected. In this way, the recommended content with ads to a user can both serve the user's interests and at the same time to allow the content operator to enhance monetization via ads.

Yet another aspect of personalized content recommendation of the present teaching relates to recommending probing content that is identified by extrapolating the currently known user interests. Traditional approaches rely on selecting either random content beyond the currently known user interests or content that has certain performance such as a high level of click activities. Random selection of probing content presents a low possibility to discover a user's unknown interests. Identifying probing content by choosing content for which a higher level of activities are observed is also problematic because there can be many pieces of content that a user may potentially be interested but there is a low level of activities associated therewith. The present teaching discloses ways to identify probing content by extrapolating the currently known interest with the flexibility of how far removed from the currently known interests. This approach also incorporates the mechanism to identify quality probing content so that there is an enhanced likelihood to discover a user's unknown interests. The focus of interests at any moment can be used as an anchor interest based on which probing interests (which are not known to be interests of the user) can be extrapolated from the anchor interests and probing content can be selected based on the probing interests and recommended to the user together with the content of the anchor interests. Probing interests/content may also be determined based on other considerations such as locale, time, or device type. In this way, the disclosed personalized content recommendation system can continually explore and discover unknown interests of a user to understand better the overall interests of the user in order to expand the scope of service.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 depicts an exemplary system diagram 10 for personalized content recommendation to a user 105, according to an embodiment of the present teaching. System 10 comprises a personalized content recommendation module 100, which comprises numerous sub modules, content sources 110, knowledge archives 115, third party platforms 120, and advertisers 125 with advertisement taxonomy 127 and advertisement database 126. Content sources 110 may be any source of on-line content such as on-line news, published papers, blogs, on-line tabloids, magazines, audio content, image content, and video content. It may be content from content provider such as Yahoo! Finance, Yahoo! Sports, CNN, and ESPN. It may be multi-media content or text or any other form of content comprised of website content, social media content, such as Facebook, twitter, Reddit, etc, or any other content rich provider. It may be licensed content from providers such AP and Reuters. It may also be content crawled and indexed from various sources on the Internet. Content sources 110 provide a vast array of content to the personalized content recommendation module 100 of system 10.

Knowledge archives 115 may be an on-line encyclopedia such as Wikipedia or indexing system such as an on-line dictionary. On-line concept archives 115 may be used for its content as well as its categorization or indexing systems. Knowledge archives 115 provide extensive classification system to assist with the classification of both the user's 105 preferences as well as classification of content. Knowledge concept archives, such as Wikipedia may have hundreds of thousands to millions of classifications and sub-classifications. A classification is used to show the hierarchy of the category. Classifications serve two main purposes. First they help the system understand how one category relates to another category and second, they help the system maneuver between higher levels on the hierarchy without having to move up and down the subcategories. The categories or classification structure found in knowledge archives 115 is used for multidimensional content vectors as well as multidimensional user profile vectors which are utilized by personalized content recommendation module 100 to match personalized content to a user 105. Third party platforms 120 maybe any third party applications including but not limited to social networking sites like Facebook, Twitter, LinkedIn, Google+. It may include third party mail servers such as GMail or Bing Search. Third party platforms 120 provide both a source of content as well as insight into a user's personal preferences and behaviors.

Advertisers 125 are coupled with the ad content database 126 as well as an ads classification system or ad. taxonomy 127 intended for classified advertisement content. Advertisers 125 may provide streaming content, static content, and sponsored content. Advertising content may be placed at any location on a personalized content page and may be presented both as part of a content stream as well as a standalone advertisement, placed strategically around or within the content stream.

Personalized content recommendation module 100 comprises applications 130, content pool 135, content pool generation/update unit 140, concept/content analyzer 145, content crawler 150, unknown interest explorer 215, user understanding unit 155, user profiles 160, content taxonomy 165, context information analyzer 170, user event analyzer 175, third party interest analyzer 190, social media content source identifier 195, advertisement insertion unit 200 and content/advertisement/taxonomy correlator 205. These components are connected to achieve personalization, content pooling, and recommending personalized content to a user. For example, the content ranking unit 210 works in connection with context information analyzer 170, the unknown interest explorer 215, and the ad insertion unit 200 to generate personalized content to be recommended to a user with personalized ads or probing content inserted. To achieve personalization, the user understanding unit 155 works in connection with a variety of components to dynamically and continuously update the user profiles 160, including content taxonomy 165, the knowledge archives 115, user event analyzer 175, and the third party interest analyzer 190. Various components are connected to continuously maintain a content pool, including the content pool generation/update unit 140, user event analyzer 175, social media content source identifier 195, content/concept analyzer 145, content crawler 150, the content taxonomy 165, as well as user profiles 160.

Personalized content recommendation module 100 is triggered when user 105 engages with system 10 through applications 130. Applications 130 may receive information in the form of a user id, cookies, log in information from user 105 via some form of computing device. User 105 may access system 10 via a wired or wireless device and may be stationary or mobile. User 105 may interface with the applications 130 on a tablet, a Smartphone, a laptop, a desktop or any other computing device which may be embedded in devices such as watches, eyeglasses, or vehicles. In addition to receiving insights from the user 105 about what information the user 105 might be interested, applications 130 provides information to user 105 in the form of personalized content stream. User insights might be user search terms entered to the system, declared interests, user clicks on a particular article or subject, user dwell time or scroll over of particular content, user skips with respect to some content, etc. User insights may be a user indication of a like, a share, or a forward action on a social networking site, such as Facebook, or even peripheral activities such as print or scan of certain content. All of these user insights or events are utilized by the personalized content recommendation module 100 to locate and customize content to be presented to user 105. User insights received via applications 130 are used to update personalized profiles for users which may be stored in user profiles 160. User profiles 160 may be database or a series of databases used to store personalized user information on all the users of system 10. User profiles 160 may be a flat or relational database and may be stored in one or more locations. Such user insights may also be used to determine how to dynamically update the content in the content pool 135.

A specific user event received via applications 130 is passed along to user event analyzer 175, which analyzes the user event information and feeds the analysis result with event data to the user understanding unit 155 and/or the content pool generation/update unit 140. Based on such user event information, the user understanding unit 155 estimates short term interests of the user and/or infer user's long term interests based on behaviors exhibited by user 105 over long or repetitive periods. For example, a long term interest may be a general interest in sports, where as a short term interest may be related to a unique sports event, such as the Super Bowl at a particular time. Over time, a user's long term interest may be estimated by analyzing repeated user events. A user who, during every engagement with system 10, regularly selects content related to the stock market may be considered as having a long term interest in finances. In this case, system 10 accordingly, may determine that personalized content for user 105 should contain content related to finance. Contrastingly, short term interest may be determined based on user events which may occur frequently over a short period, but which is not something the user 105 is interested in in the long term. For example, a short term interest may reflect the momentary interest of a user which may be triggered by something the user saw in the content but such an interest may not persist over time. Both short and long term interest are important in terms of identifying content that meets the desire of the user 105, but need to be managed separately because of the difference in their nature as well as how they influence the user.

In some embodiments, short term interests of a user may be analyzed to predict the user's long term interests. To retain a user, it is important to understand the user's persistent or long term interests. By identifying user 105's short term interest and providing him/her with a quality personalized experience, system 10 may convert an occasional user into a long term user. Additionally, short term interest may trend into long term interest and vice versa. The user understanding unit 155 provides the capability of estimating both short and long term interests.

The user understanding unit 155 gathers user information from multiple sources, including all the user's events, and creates one or more multidimensional personalization vectors. In some embodiments, the user understanding unit 155 receives inferred characteristics about the user 105 based on the user events, such as the content he/she views, self declared interests, attributes or characteristics, user activities, and/or events from third party platforms. In an embodiment, the user understanding unit 155 receives inputs from social media content source identifier 195. Social media content source identifier 195 relies on user 105's social media content to personalize the user's profile. By analyzing the user's social media pages, likes, shares, etc, social media content source identifier 195 provides information for user understanding unit 155. The social media content source identifier 195 is capable of recognizing new content sources by identifying, e.g., quality curators on social media platforms such as Twitter, Facebook, or blogs, and enables the personalized content recommendation module 100 to discover new content sources from where quality content can be added to the content pool 135. The information generated by social media content source identifier 195 may be sent to a content/concept analyzer 145 and then mapped to specific category or classification based on content taxonomy 165 as well as a knowledge archives 115 classification system.

The third party interest analyzer 190 leverages information from other third party platforms about users active on such third party platforms, their interests, as well as content these third party users to enhance the performance of the user understanding unit 155. For example, when information about a large user population can be accessed from one or more third party platforms, the user understanding unit 155 can rely on data about a large population to establish a baseline interest profile to make the estimation of the interests of individual users more precise and reliable, e.g., by comparing interest data with respect to a particular user with the baseline interest profile which will capture the user's interests with a high level of certainty.

When new content is identified from content source 110 or third party platforms 120, it is processed and its concepts are analyzed. The concepts can be mapped to one or more categories in the content taxonomy 165 and the knowledge archives 115. The content taxonomy 165 is an organized structure of concepts or categories of concepts and it may contain a few hundred classifications of a few thousand. The knowledge archives 115 may provide millions of concepts, which may or may not be structures in a similar manner as the content taxonomy 165. Such content taxonomy and knowledge archives may serve as a universal interest space. Concepts estimated from the content can be mapped to a universal interest space and a high dimensional vector can be constructed for each piece of content and used to characterize the content. Similarly, for each user, a personal interest profile may also be constructed, mapping the user's interests, characterized as concepts, to the universal interest space so that a high dimensional vector can be constructed with the user's interests levels populated in the vector.

Content pool 135 may be a general content pool with content to be used to serve all users. The content pool 135 may also be structured so that it may have personalized content pool for each user. In this case, content in the content pool is generated and retained with respect to each individual user. The content pool may also be organized as a tiered system with both the general content pool and personalized individual content pools for different users. For example, in each content pool for a user, the content itself may not be physically present but is operational via links, pointers, or indices which provide references to where the actual content is stored in the general content pool.

Content pool 135 is dynamically updated by content pool generation/update module 140. Content in the content pool comes and go and decisions are made based on the dynamic information of the users, the content itself, as well as other types of information. For example, when the performance of content deteriorates, e.g., low level of interests exhibited from users, the content pool generation/update unit 140 may decide to purge it from the content pool. When content becomes stale or outdated, it may also be removed from the content pool. When there is a newly detected interest from a user, the content pool generation/update unit 140 may fetch new content aligning with the newly discovered interests. User events may be an important source of making observations as to content performance and user interest dynamics. User activities are analyzed by the user event analyzer 175 and such Information is sent to the content pool generation/update unit 140. When fetching new content, the content pool generation/update unit 140 invokes the content crawler 150 to gather new content, which is then analyzed by the content/concept analyzer 145, then evaluated by the content pool generation/update unit 140 as to its quality and performance before it is decided whether it will be included in the content pool or not. Content may be removed from content pool 135 because it is no longer relevant, because other users are not considering it to be of high quality or because it is no longer timely. As content is constantly changing and updating content pool 135 is constantly changing and updating providing user 105 with a potential source for high quality, timely personalized content.

In addition to content, personalized content recommendation module 100 provides for targeted or personalized advertisement content from advertisers 125. Advertisement database 126 houses advertising content to be inserted into a user's content stream. Advertising content from ad database 126 is inserted into the content stream via Content ranking unit 210. The personalized selection of advertising content can be based on the user's profile. Content/advertisement/user taxonomy correlator 205 may re-project or map a separate advertisement taxonomy 127 to the taxonomy associated with the user profiles 160. Content/advertisement/user taxonomy correlator 205 may apply a straight mapping or may apply some intelligent algorithm to the re-projection to determine which of the users may have a similar or related interest based on similar or overlapping taxonomy categories.

Content ranking unit 210 generates the content stream to be recommended to user 105 based on content, selected from content pool 135 based on the user's profile, as well as advertisement, selected by the advertisement insertion unit 200. The content to be recommended to the user 105 may also be determined, by the content ranking unit 210, based on information from the context information analyzer 170. For example, if a user is currently located in a beach town which differs from the zip code in the user's profile, it can be inferred that the user may be on vacation. In this case, information related to the locale where the user is currently in may be forwarded from the context information analyzer to the Content ranking unit 210 so that it can select content that not only fit the user's interests but also is customized to the locale. Other context information include day, time, and device type. The context information can also include an event detected on the device that the user is currently using such as a browsing event of a website devoted to fishing. Based on such a detected event, the momentary interest of the user may be estimated by the context information analyzer 170, which may then direct the Content ranking unit 210 to gather content related to fishing amenities in the locale the user is in for recommendation.

The personalized content recommendation module 100 can also be configured to allow probing content to be included in the content to be recommended to the user 105, even though the probing content does not represent subject matter that matches the current known interests of the user. Such probing content is selected by the unknown interest explorer 215. Once the probing content is incorporated in the content to be recommended to the user, information related to user activities directed to the probing content (including no action) is collected and analyzed by the user event analyzer 175, which subsequently forwards the analysis result to long/short term interest identifiers 180 and 185. If an analysis of user activities directed to the probing content reveals that the user is or is not interested in the probing content, the user understanding unit 155 may then update the user profile associated with the probed user accordingly. This is how unknown interests may be discovered. In some embodiments, the probing content is generated based on the current focus of user interest (e.g., short term) by extrapolating the current focus of interests. In some embodiments, the probing content can be identified via a random selection from the general content, either from the content pool 135 or from the content sources 110, so that an additional probing can be performed to discover unknown interests.

To identify personalized content for recommendation to a user, the content ranking unit 210 takes all these inputs and identify content based on a comparison between the user profile vector and the content vector in a multiphase ranking approach. The selection may also be filtered using context information. Advertisement to be inserted as well as possibly probing content can then be merged with the selected personalized content.

Figure 2:
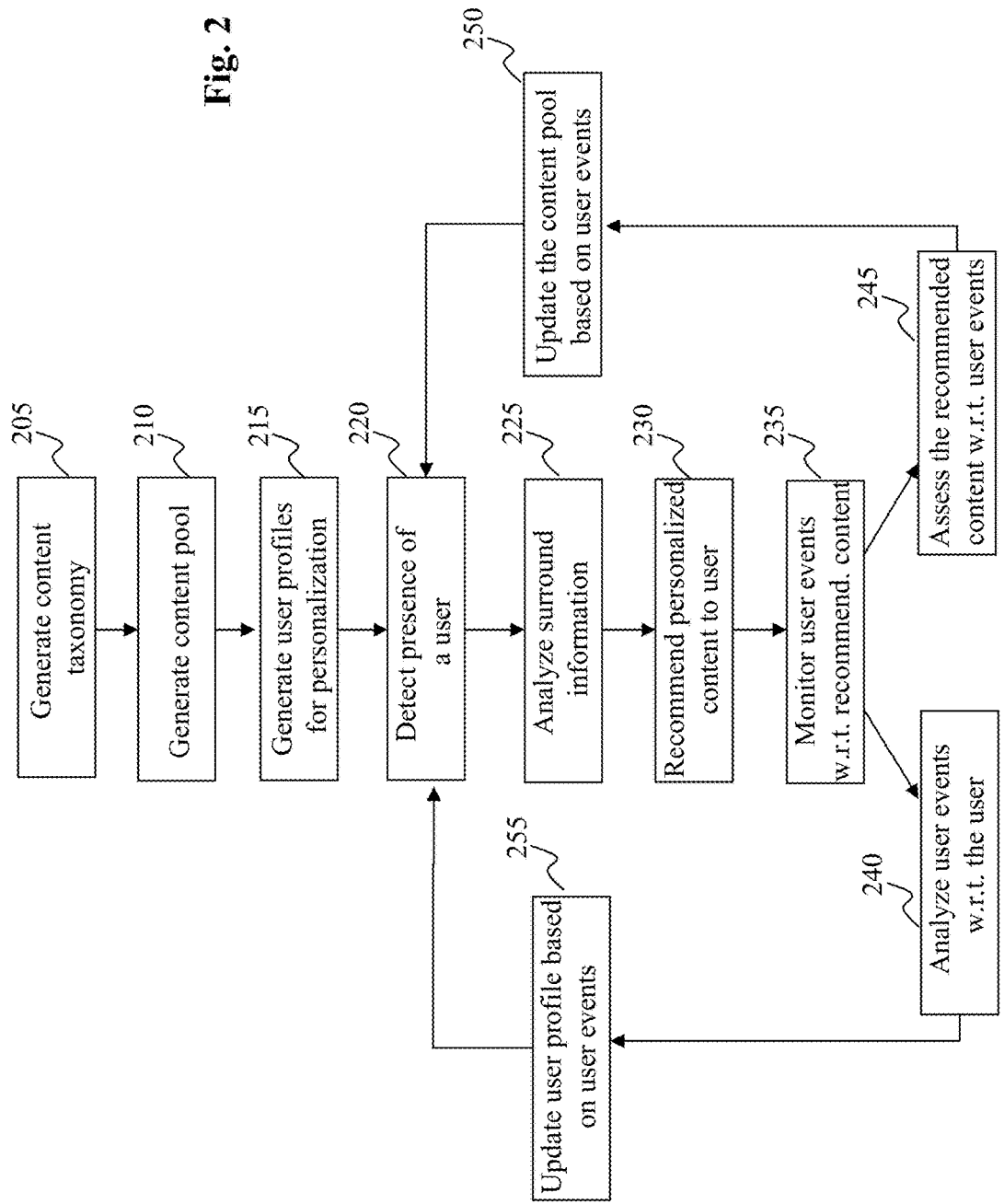
FIG. 2 is a flowchart of an exemplary process for personalized content recommendation, according to an embodiment of the present teaching.
Figure 3:
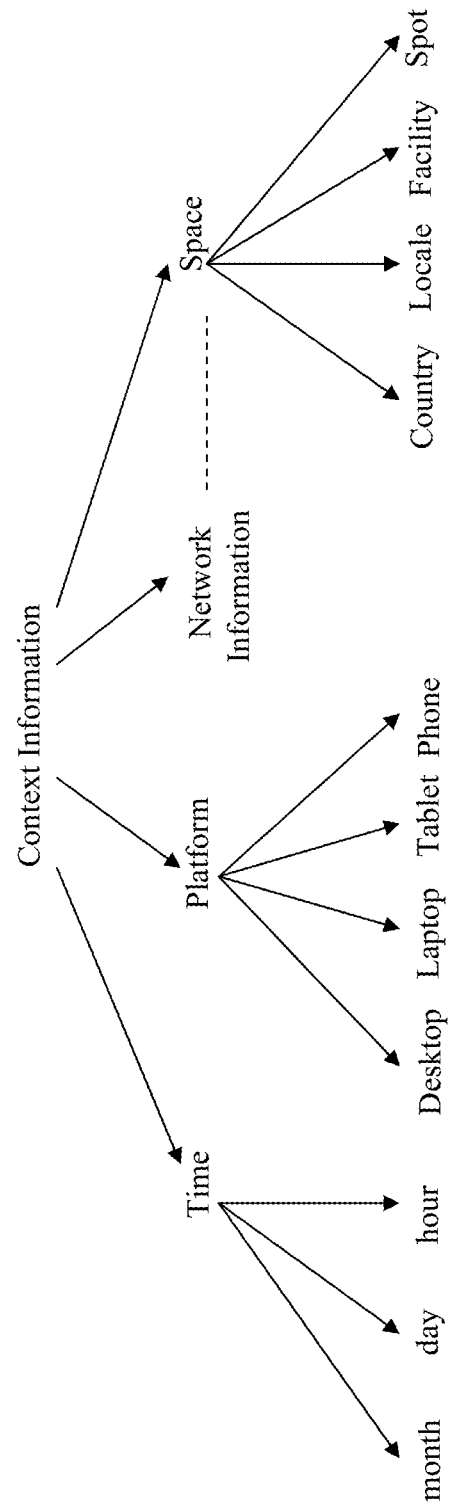
FIG. 3 illustrates exemplary types of context information.

FIG. 2 is a flowchart of an exemplary process for personalized content recommendation, according to an embodiment of the present teaching. Content taxonomy is generated at 205. Content is accessed from different content sources and analyzed and classified into different categories, which can be pre-defined. Each category is given some labels and then different categories are organized into some structure, e.g., a hierarchical structure. A content pool is generated at 210. Different criteria may be applied when the content pool is created. Examples of such criteria include topics covered by the content in the content pool, the performance of the content in the content pool, etc. Sources from which content can be obtained to populate the content pool include content sources 110 or third party platforms 120 such as Facebook, Twitter, blogs, etc. FIG. 3 provides a more detailed exemplary flowchart related to content pool creation, according to an embodiment of the present teaching. User profiles are generated at 215 based on, e.g., user information, user activities, identified short/long term interests of the user, etc. The user profiles may be generated with respect to a baseline population interest profile, established based on, e.g., information about third party interest, knowledge archives, and content taxonomies.

Figure 4:
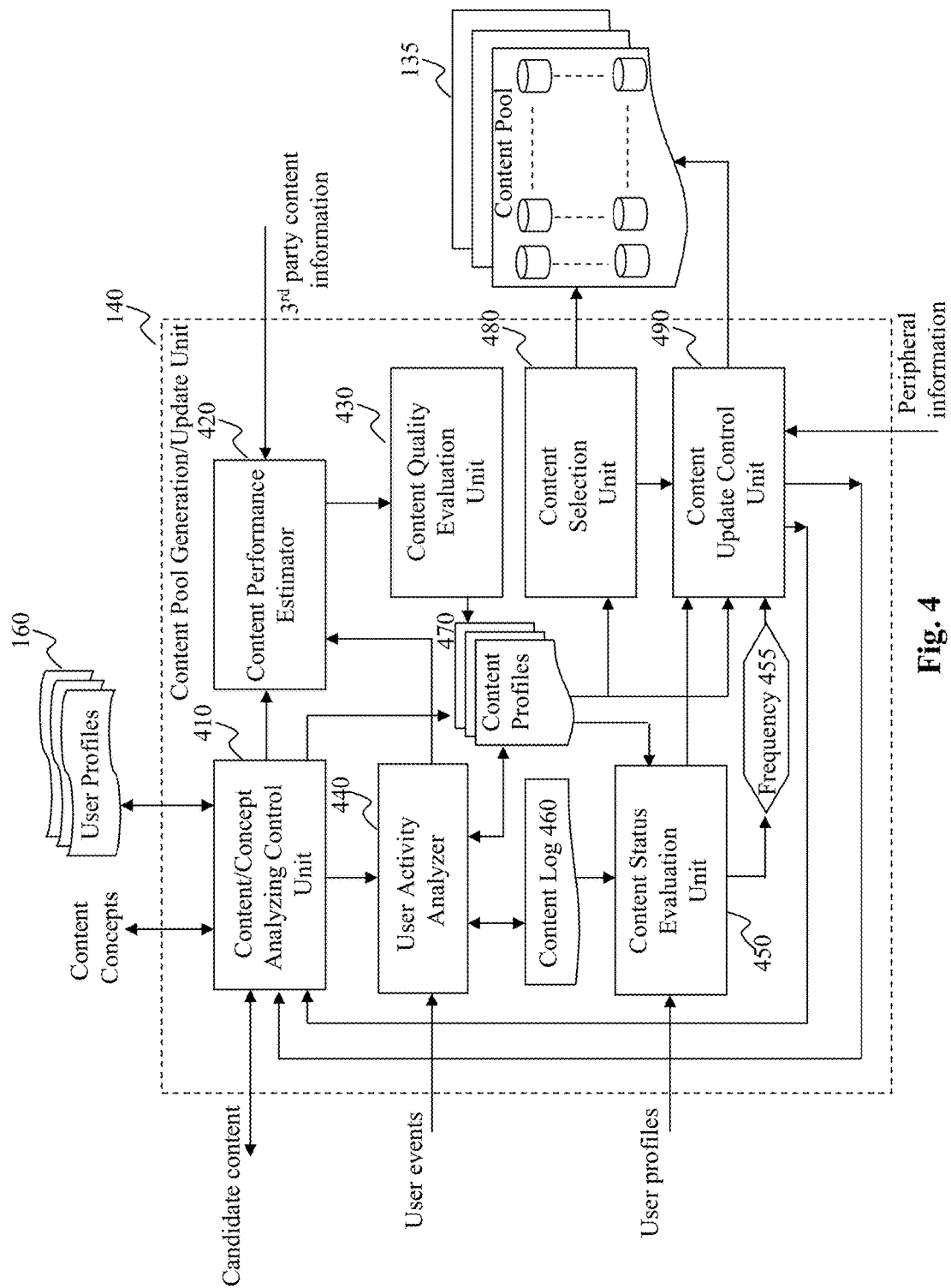
FIG. 4 depicts an exemplary diagram of a content pool generation/update unit, according to an embodiment of the present teaching.

Once the user profiles and the content pool are created, when the system 10 detects the presence of a user, at 220, the context information, such as locale, day, time, may be obtained and analyzed, at 225. FIG. 4 illustrates exemplary types of context information. Based on the detected user's profile, optionally context information, personalized content is identified for recommendation. A high level exemplary flow for generating personalized content for recommendation is presented in FIG. 5. Such gathered personalized content may be ranked and filtered to achieve a reasonable size as to the amount of content for recommendation. Optionally (not shown), advertisement as well as probing content may also be incorporated in the personalized content. Such content is then recommended to the user at 230.

User reactions or activities with respect to the recommended content are monitored, at 235, and analyzed at 240. Such events or activities include clicks, skips, dwell time measured, scroll location and speed, position, time, sharing, forwarding, hovering, motions such as shaking, etc. It is understood that any other events or activities may be monitored and analyzed. For example, when the user moves the mouse cursor over the content, the title or summary of the content may be highlighted or slightly expanded. In another example, when a user interacts with a touch screen by her/his finger[s], any known touch screen user gestures may be detected. In still another example, eye tracking on the user device may be another user activity that is pertinent to user behaviors and can be detected. The analysis of such user events includes assessment of long term interests of the user and how such exhibited short term interests may influence the system's understanding of the user's long term interests. Information related to such assessment is then forwarded to the user understanding unit 155 to guide how to update, at 255, the user's profile. At the same time, based on the user's activities, the portion of the recommended content that the user showed interests are assessed, at 245, and the result of the assessment is then used to update, at 250, the content pool. For example, if the user shows interests on the probing content recommended, it may be appropriate to update the content pool to ensure that content related to the newly discovered interest of the user will be included in the content pool.

FIG. 3 illustrates different types of context information that may be detected and utilized in assisting to personalize content to be recommended to a user. In this illustration, context information may include several categories of data, including, but not limited to, time, space, platform, and network conditions. Time related information can be time of the year (e.g., a particular month from which season can be inferred), day of a week, specific time of the day, etc. Such information may provide insights as to what particular set of interests associated with a user may be more relevant. To infer the particular interests of a user at a specific moment may also depend on the locale that the user is in and this can be reflected in the space related context information, such as which country, what locale (e.g., tourist town), which facility the user is in (e.g., at a grocery store), or even the spot the user is standing at the moment (e.g., the user may be standing in an aisle of a grocery store where cereal is on display). Other types of context information includes the specific platform related to the user's device, e.g., Smartphone, Tablet, laptop, desktop, bandwidth/data rate allowed on the user's device, which will impact what types of content may be effectively presented to the user. In addition, the network related information such as state of the network where the user's device is connected to, the available bandwidth under that condition, etc. may also impact what content should be recommended to the user so that the user can receive or view the recommended content with reasonable quality.

FIG. 4 depicts an exemplary system diagram of the content pool generation/update unit 140, according to an embodiment of the present teaching. The content pool 135 can be initially generated and then maintained according to the dynamics of the users, contents, and needs detected. In this illustration, the content pool generation/update unit 140 comprises a content/concept analyzing control unit 410, a content performance estimator 420, a content quality evaluation unit 430, a content selection unit 480, which will select appropriate content to place into the content pool 135. In addition, to control how content is to be updated, the content pool generation/update unit 140 also includes a user activity analyzer 440, a content status evaluation unit 450, and a content update control unit 490.

The content/concept analyzing control unit 410 interfaces with the content crawler 150 (FIG. 1) to obtain candidate content that is to be analyzed to determine whether the new content is to be added to the content pool. The content/concept analyzing control unit 410 also interfaces with the content/concept analyzer 145 (see FIG. 1) to get the content analyzed to extract concepts or subjects covered by the content. Based on the analysis of the new content, a high dimensional vector for the content profile can be computed via, e.g., by mapping the concepts extracted from the content to the universal interest space, e.g., defined via Wikipedia or other content taxonomies. Such a content profile vector can be compared with user profiles 160 to determine whether the content is of interest to users. In addition, content is also evaluated in terms of its performance by the content performance estimator 420 based on, e.g., third party information such as activities of users from third party platforms so that the new content, although not yet acted upon by users of the system, can be assessed as to its performance. The content performance information may be stored, together with the content's high dimensional vector related to the subject of the content, in the content profile 470. The performance assessment is also sent to the content quality evaluation unit 430, which, e.g., will rank the content in a manner consistent with other pieces of content in the content pool. Based on such rankings, the content selection unit 480 then determines whether the new content is to be incorporated into the content pool 135.

To dynamically update the content pool 135, the content pool generation/update unit 140 may keep a content log 460 with respect to all content presently in the content pool and dynamically update the log when more information related to the performance of the content is received. When the user activity analyzer 440 receives information related to user events, it may log such events in the content log 460 and perform analysis to estimate, e.g., any change to the performance or popularity of the relevant content over time. The result from the user activity analyzer 440 may also be utilized to update the content profiles, e.g., when there is a change in performance. The content status evaluation unit 450 monitors the content log and the content profile 470 to dynamically determine how each piece of content in the content pool 135 is to be updated. Depending on the status with respect to a piece of content, the content status evaluation unit 450 may decide to purge the content if its performance degrades below a certain level. It may also decide to purge a piece of content when the overall interest level of users of the system drops below a certain level. For content that requires update, e.g., news or journals, the content status evaluation unit 450 may also control the frequency 455 of the updates based on the dynamic information it receives. The content update control unit 490 carries out the update jobs based on decisions from the content status evaluation unit 450 and the frequency at which certain content needs to be updated. The content update control unit 490 may also determine to add new content whenever there is peripheral information indicating the needs, e.g., there is an explosive event and the content in the content pool on that subject matter is not adequate. In this case, the content update control unit 490 analyzes the peripheral information and if new content is needed, it then sends a control signal to the content/concept analyzing control unit 410 so that it can interface with the content crawler 150 to obtain new content.

Figure 5:
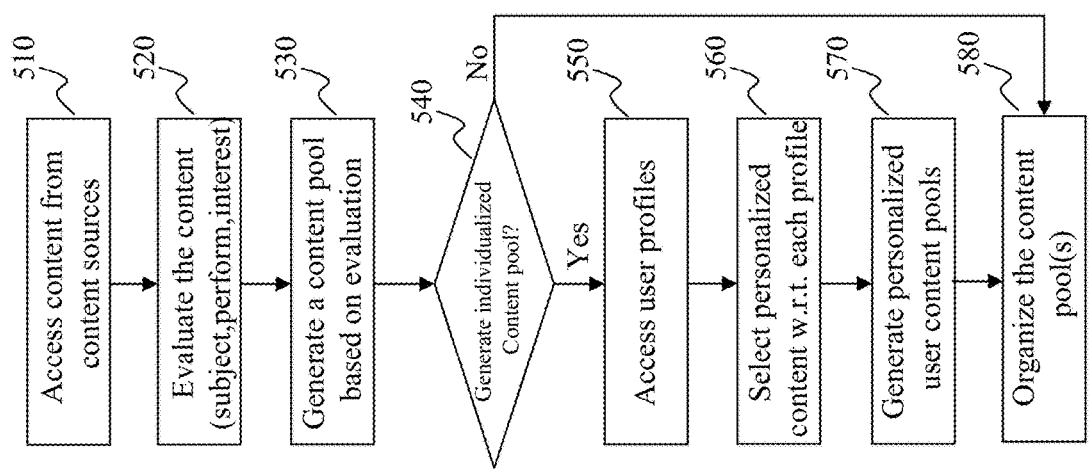
FIG. 5 is a flowchart of an exemplary process of creating a content pool, according to an embodiment of the present teaching.

FIG. 5 is a flowchart of an exemplary process of creating the content pool, according to an embodiment of the present teaching. Content is accessed at 510 from content sources, which include content from content portals such as Yahoo!, general Internet sources such as web sites or FTP sites, social media platforms such as Twitter, or other third party platforms such as Facebook. Such accessed content is evaluated, at 520, as to various considerations such as performance, subject matters covered by the content, and how it fit users' interests. Based on such evaluation, certain content is selected to generate, at 530, the content pool 135, which can be for the general population of the system or can also be further structured to create sub content pools, each of which may be designated to a particular user according to the user's particular interests. At 540, it is determined whether user-specific content pools are to be created. If not, the general content pool 135 is organized (e.g., indexed or categorized) at 580. If individual content pools for individual users are to be created, user profiles are obtained at 550, and with respect to each user profile, a set of personalized content is selected at 560 that is then used to create a sub content pool for each such user at 570. The overall content pool and the sub content pools are then organized at 580.

Figure 6:
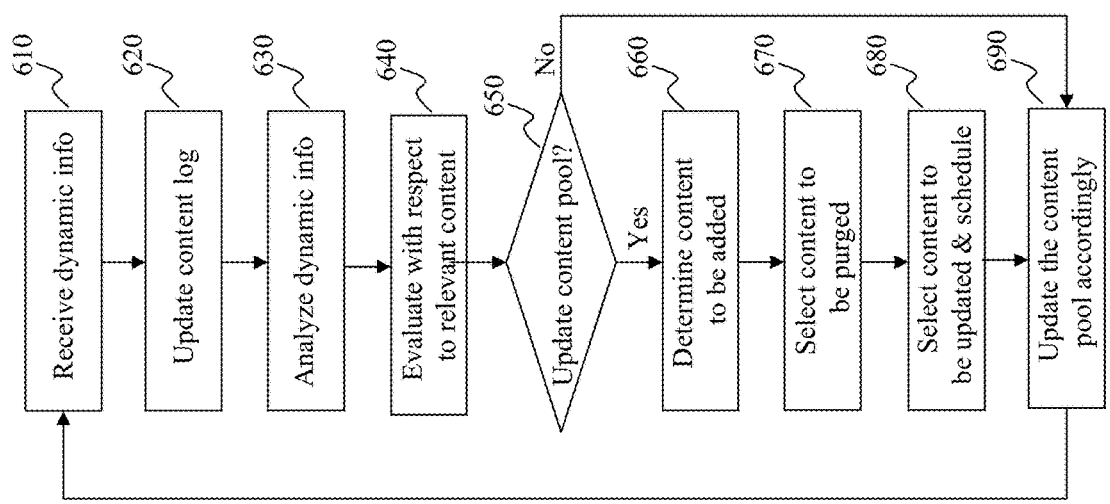
FIG. 6 is a flowchart of an exemplary process for updating a content pool, according to an embodiment of the present teaching.

FIG. 6 is a flowchart of an exemplary process for updating the content pool 135, according to an embodiment of the present teaching. Dynamic information is received at 610 and such information includes user activities, peripheral information, user related information, etc. Based on the received dynamic information, the content log is updated at 620 and the dynamic information is analyzed at 630. Based on the analysis of the received dynamic information, it is evaluated, at 640, with respect to the content implicated by the dynamic information, as to the change of status of the content. For example, if received information is related to user activities directed to specific content pieces, the performance of the content piece may need to be updated to generate a new status of the content piece. It is then determined, at 650, whether an update is needed. For instance, if the dynamic information from a peripheral source indicates that content of certain topic may have a high demand in the near future, it may be determined that new content on that topic may be fetched and added to the content pool. In this case, at 660, content that needs to be added is determined. In addition, if the performance or popularity of a content piece has just dropped below an acceptable level, the content piece may need to be purged from the content pool 135. Content to be purged is selected at 670. Furthermore, when update is needed for regularly refreshed content such as journal or news, the schedule according to which update is made may also be changed if the dynamic information received indicates so. This is achieved at 680.

Figure 7:
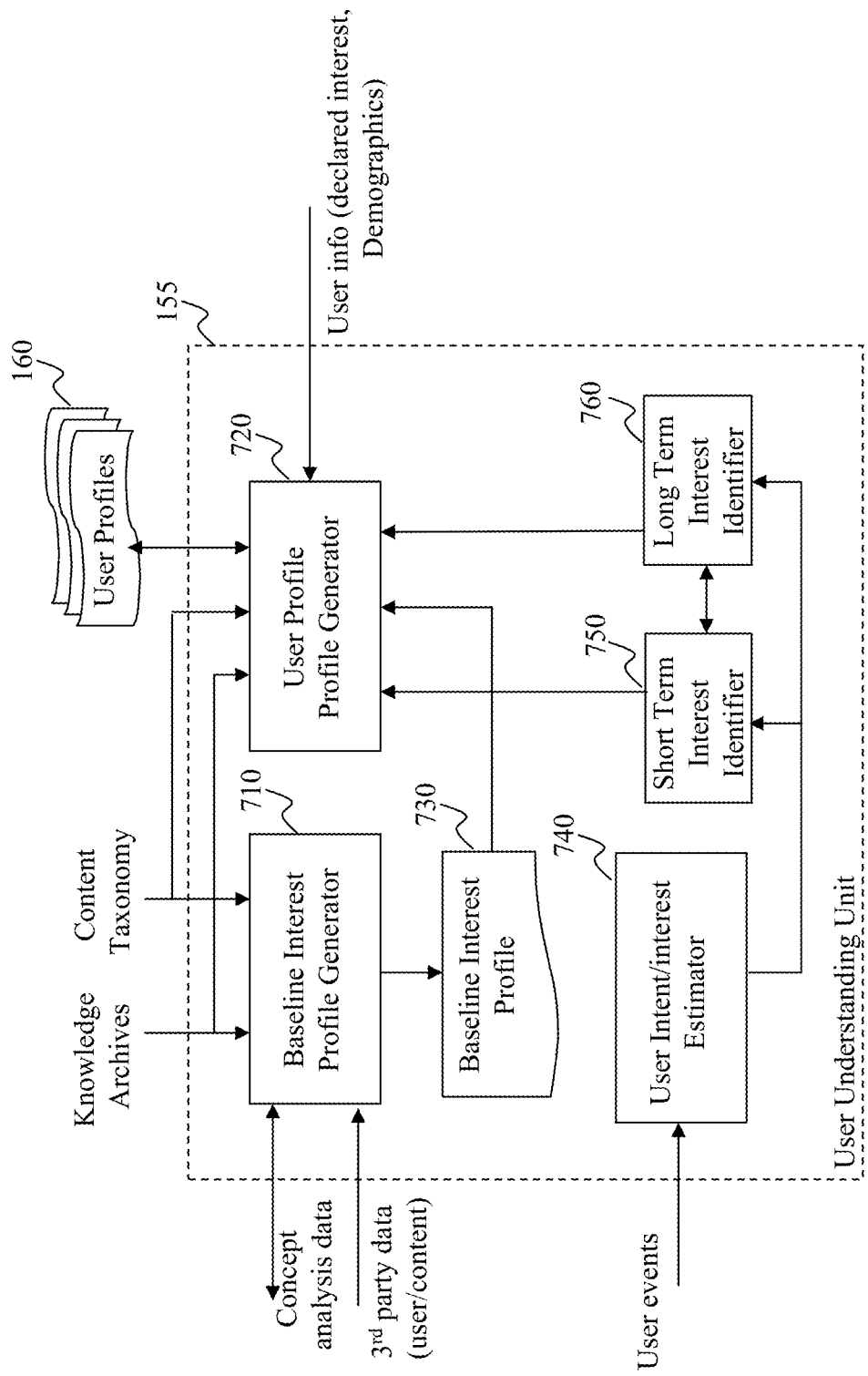
FIG. 7 depicts an exemplary diagram of a user understanding unit, according to an embodiment of the present teaching.

FIG. 7 depicts an exemplary diagram of the user understanding unit 155, according to an embodiment of the present teaching. In this exemplary construct, the user understanding unit 155 comprises a baseline interest profile generator 710, a user profile generator 720, a user intent/interest estimator 740, a short term interest identifier 750 and a long term interest identifier 760. In operation, the user understanding unit 155 takes various input and generates user profiles 160 as output. Its input includes third party data such as users' information from such third party platforms as well as content such users accessed and expressed interests, concepts covered in such third party data, concepts from the universal interest space (e.g., Wikipedia or content taxonomy), information about users for whom the personalized profiles are to be constructed, as well as information related to the activities of such users. Information from a user for whom a personalized profile is to be generated and updated includes demographics of the user, declared interests of the user, etc. Information related to user events includes the time, day, location at which a user conducted certain activities such as clicking on a content piece, long dwell time on a content piece, forwarding a content piece to a friend, etc.

In operation, the baseline interest profile generator 710 access information about a large user population including users' interests and content they are interested in from one or more third party sources (e.g., Facebook). Content from such sources is analyzed by the content/concept analyzer 145 (FIG. 1), which identifies the concepts from such content. When such concepts are received by the baseline interest profile generator 710, it maps such concepts to the knowledge archives 115 and content taxonomy 165 (FIG. 1) and generate one or more high dimensional vectors which represent the baseline interest profile of the user population. Such generated baseline interest profile is stored at 730 in the user understanding unit 155. When there is similar data from additional third party sources, the baseline interest profile 730 may be dynamically updated to reflect the baseline interest level of the growing population.

Once the baseline interest profile is established, when the user profile generator receives user information or information related to estimated short term and long term interests of the same user, it may then map the user's interests to the concepts defined by, e.g., the knowledge archives or content taxonomy, so that the user's interests are now mapped to the same space as the space in which the baseline interest profile is constructed. The user profile generator 720 then compares the user's interest level with respect to each concept with that of a larger user population represented by the baseline interest profile 730 to determine the level of interest of the user with respect to each concept in the universal interest space. This yields a high dimensional vector for each user. In combination with other additional information, such as user demographics, etc., a user profile can be generated and stored in 160.

User profiles 160 are updated continuously based on newly received dynamic information. For example, a user may declare additional interests and such information, when received by the user profile generator 720, may be used to update the corresponding user profile. In addition, the user may be active in different applications and such activities may be observed and information related to them may be gathered to determine how they impact the existing user profile and when needed, the user profile can be updated based on such new information. For instance, events related to each user may be collected and received by the user intent/interest estimator 740. Such events include that the user dwelled on some content of certain topic frequently, that the user recently went to a beach town for surfing competition, or that the user recently participated in discussions on gun control, etc. Such information can be analyzed to infer the user intent/interests. When the user activities relate to reaction to content when the user is online, such information may be used by the short term interest identifier 750 to determine the user's short term interests. Similarly, some information may be relevant to the user's long term interests. For example, the number of requests from the user to search for content related to diet information may provide the basis to infer that the user is interested in content related to diet. In some situations, estimating long term interest may be done by observing the frequency and regularity at which the user accesses certain type of information. For instance, if the user repeatedly and regularly accesses content related to certain topic, e.g., stocks, such repetitive and regular activities of the user may be used to infer his/her long term interests. The short term interest identifier 750 may work in connection with the long term interest identifier 760 to use observed short term interests to infer long term interests. Such estimated short/long term interests are also sent to the user profile generator 720 so that the personalization can be adapted to the changing dynamics.

Figure 8:
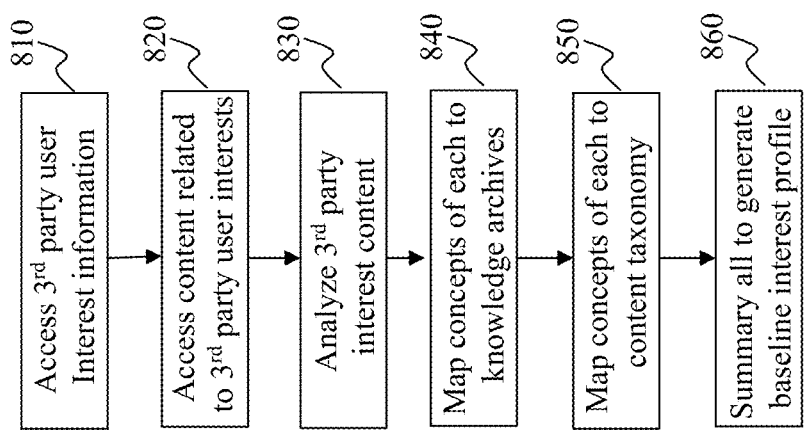
FIG. 8 is a flowchart of an exemplary process for generating a baseline interest profile, according to an embodiment of the present teaching.

FIG. 8 is a flowchart of an exemplary process for generating a baseline interest profile based on information related to a large user population, according to an embodiment of the present teaching. The third party information, including both user interest information as well as their interested content, is accessed at 810 and 820. The content related to the third party user interests is analyzed at 830 and the concepts from such content are mapped, at 840 and 850, to knowledge archives and/or content taxonomy. To build a baseline interest profile, the mapped vectors for third party users are then summarized to generate a baseline interest profile for the population. There can be a variety ways to summarize the vectors to generate an averaged interest profile with respect to the underlying population.

Figure 9:
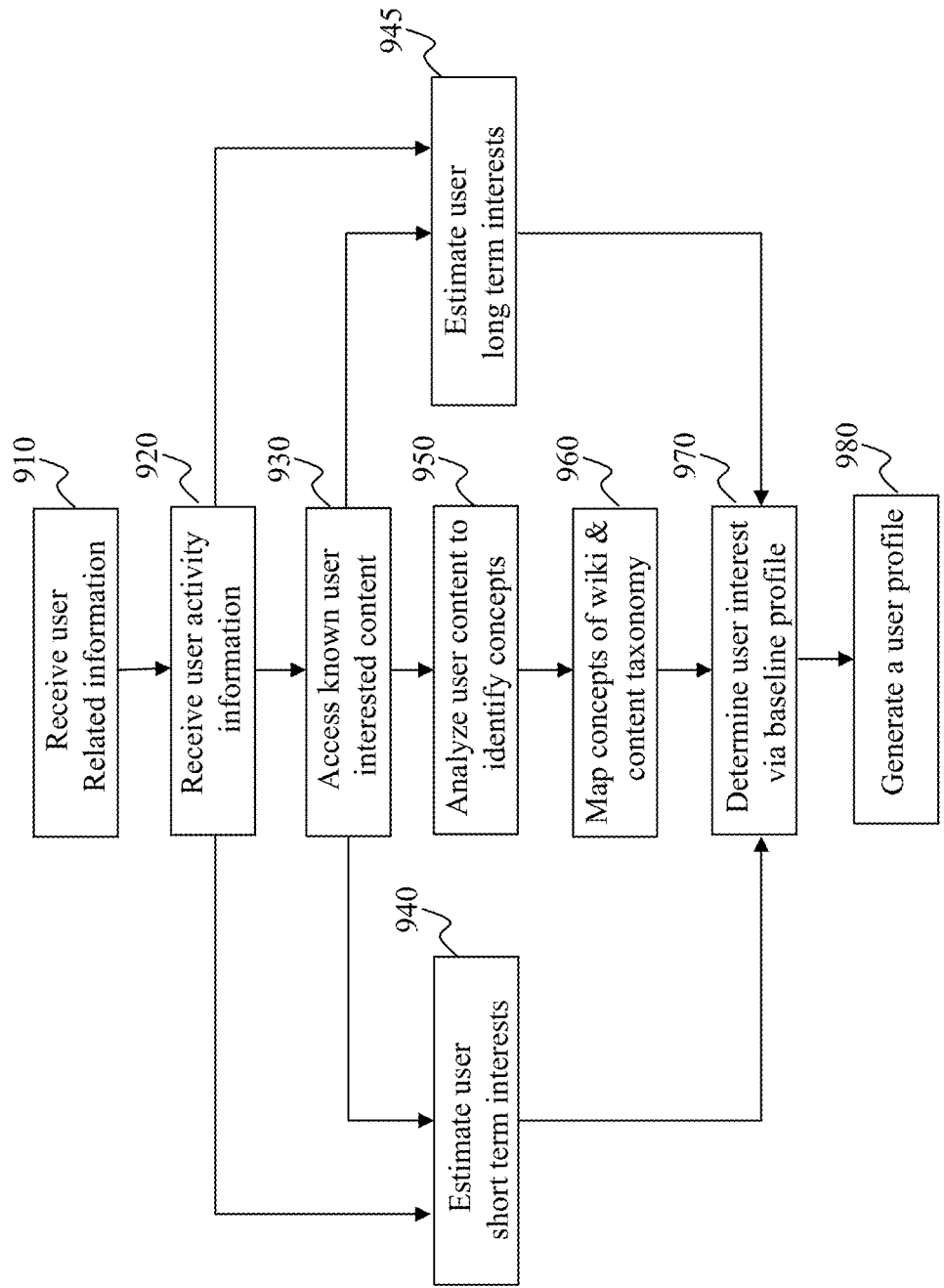
FIG. 9 is a flowchart of an exemplary process for generating a personalized user profile, according to an embodiment of the present teaching.

FIG. 9 is a flowchart of an exemplary process for generating/updating a user profile, according to an embodiment of the present teaching. User information is received first at 910. Such user information includes user demographics, user declared interests, etc. Information related to user activities is also received at 920. Content pieces that are known to be interested by the user are accessed at 930, which are then analyzed, at 950, to extract concepts covered by the content pieces. The extracted concepts are then mapped, at 960, to the universal interest space and compared with, concept by concept, the baseline interest profile to determine, at 970, the specific level of interest of the user given the population. In addition, the level of interests of each user may also be identified based on known or estimated short and long term interests that are estimated, at 940 and 945, respectively, based on user activities or content known to be interested by the user. A personalized user profile can then be generated, at 980, based on the interest level with respect to each concept in the universal interest space.

Figure 10:
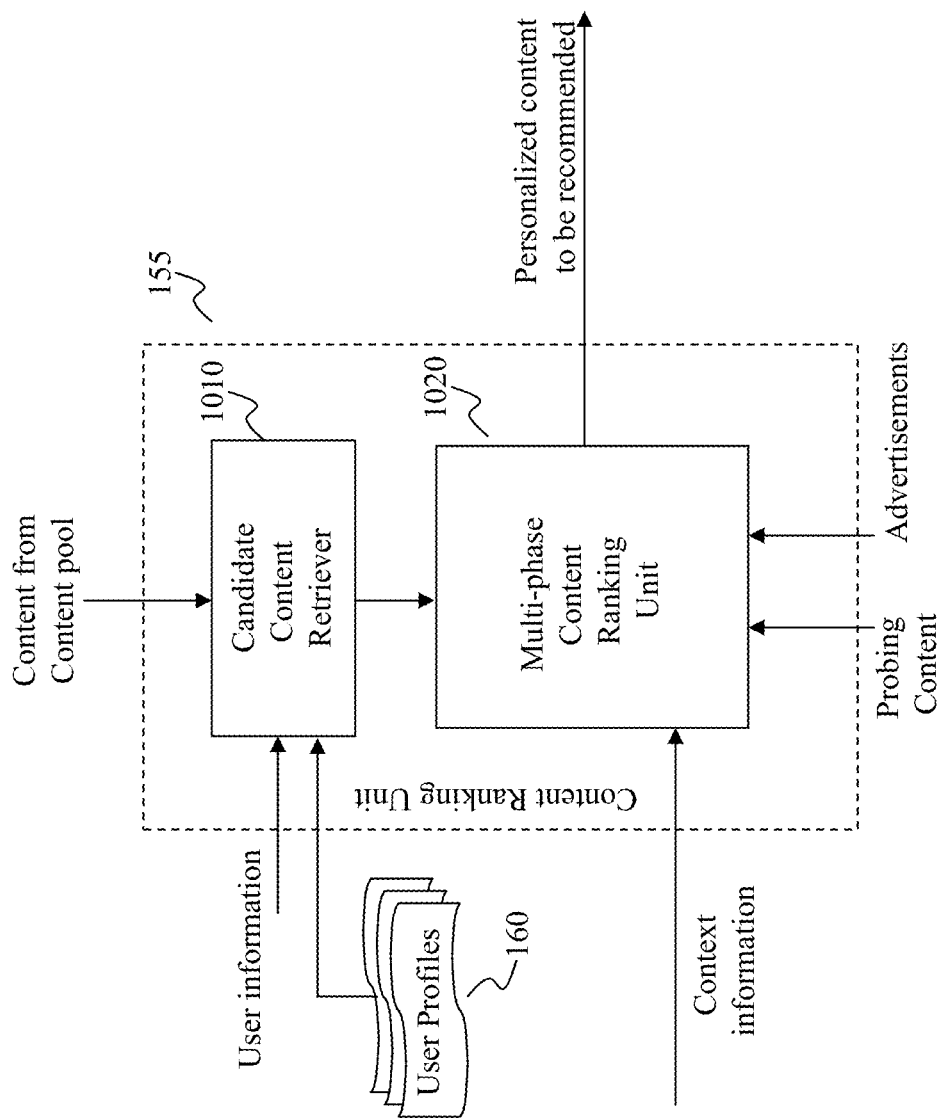
FIG. 10 depicts an exemplary system diagram for a content ranking unit, according to an embodiment of the present teaching.

FIG. 10 depicts an exemplary system diagram for the content ranking unit 210, according to an embodiment of the present teaching. The content ranking unit 210 takes variety of input and generates personalized content to be recommended to a user. The input to the content ranking unit 210 includes user information from the applications 130 with which a user is interfacing, user profiles 160, context information surrounding the user at the time, content from the content pool 135, advertisement selected by the ad insertion unit 200, and optionally probing content from the unknown interest explorer 215. The content ranking unit 210 comprises a candidate content retriever 1010 and a multi-phase content ranking unit 1020. Based on user information from applications 130 and the relevant user profile, the candidate content retriever 1010 determines the content pieces to be retrieved from the content pool 135. Such candidate content may be determined in a manner that is consistent with the user's interests or individualized. In general, there may be a large set of candidate content and it needs to be further determined which content pieces in this set are most appropriate given the context information. The multi-phase content ranking unit 1020 takes the candidate content from the candidate content retriever 1010, the advertisement, and optionally may be the probing content, as a pool of content for recommendation and then performs multiple stages of ranking, e.g., relevance based ranking, performance based ranking, etc. as well as factors related to the context surrounding this recommendation process, and selects a subset of the content to be presented as the personalized content to be recommended to the user.

Figure 11:
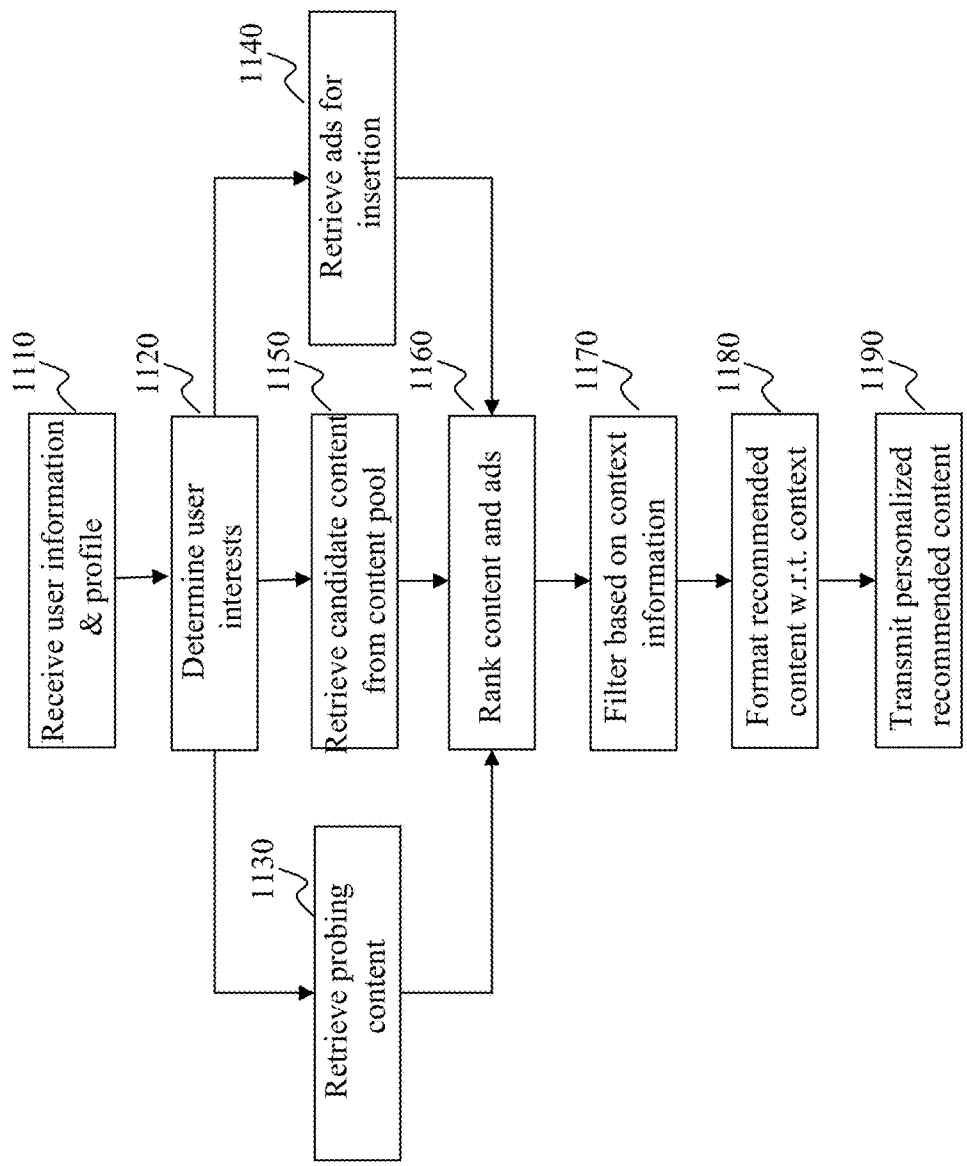
FIG. 11 is a flowchart of an exemplary process for the content ranking unit, according to an embodiment of the present teaching.

FIG. 11 is a flowchart of an exemplary process for the content ranking unit, according to an embodiment of the present teaching. User related information and user profile are received first at 1110. Based on the received information, user's interests are determined at 1120, which can then be used to retrieve, at 1150, candidate content from the content pool 135. The user's interests may also be utilized in retrieving advertisement and/or probing content at 1140 and 1130, respectively. Such retrieved content is to be further ranked, at 1160, in order to select a subset as the most appropriate for the user. As discussed above, the selection takes place in a multi-phase ranking process, each of the phases is directed to some or a combination of ranking criteria to yield a subset of content that is not only relevant to the user as to interests but also high quality content that likely will be interested by the user. The selected subset of content may also be further filtered, at 1170, based on, e.g., context information. For example, even though a user is in general interested in content about politics and art, if the user is currently in Milan, Italy, it is likely that the user is on vacation. In this context, rather than choosing content related to politics, the content related to art museums in Milan may be more relevant. The multi-phase content ranking unit 1020 in this case may filter out the content related to politics based on this contextual information. This yields a final set of personalized content for the user. At 1180, based on the contextual information associated with the surrounding of the user (e.g., device used, network bandwidth, etc.), the content ranking unit packages the selected personalized content, at 1180, in accordance with the context information and then transmits, at 1190, the personalized content to the user.

More detailed disclosures of various aspects of the system 10, particularly the personalized content recommendation module 100, are covered in different U.S. patent applications as well as PCT applications, entitled "Method and System For User Profiling Via Mapping Third Party Interests To A Universal Interest Space", "Method and System for Multi-Phase Ranking For Content Personalization", "Method and System for Measuring User Engagement Using Click/Skip In Content Stream", "Method and System for Dynamic Discovery And Adaptive Crawling of Content From the Internet", "Method and System For Dynamic Discovery of Interesting URLs From Social Media Data Stream", "Method and System for Discovery of User Unknown Interests", "Method and System for Efficient Matching of User Profiles with Audience Segments", "Method and System For Mapping Short Term Ranking Optimization Objective to Long Term Engagement", "Social Media Based Content Selection System", "Method and System For Measuring User Engagement From Stream Depth", "Method and System For Measuring User Engagement Using Scroll Dwell Time", "Almost Online Large Scale Collaborative Based Recommendation System", and "Efficient and Fault-Tolerant Distributed Algorithm for Learning Latent Factor Models through Matrix Factorization". The present teaching is particularly directed to measuring user engagement in personalized content recommendation.

One of the major challenges in personalized content recommendation is to find the good signals or representations of user interests and engagement. Traditionally, user engagement in personalized content recommendation is measured based on explicit user activities/actions, such as clicking, or other definitive interactions. For example, given a set of recommended content on the web page, the content that has been explicitly interacted with is considered as being engaged by the users and thus, is assigned a positive label for engagement, whereas everything else on the web page is considered as not being engaged and thus, is assigned a negative label.

This assumption, however, may not be true, in particular, in recommending "endless" streams of information, in which a user can continue to scroll down the page and new content is continually loaded. Such manner of recommending content in personalized content streams has become more and more popular on mobile platforms and also some desktop applications. More websites and applications are shifting their directions of display content to an infinite stream format rather than a paginated form. However, existing systems still measure engagement based on clicking or other explicit interactions, although content streams in these system may often be consumed without the users providing an explicit action. In such cases, the user is engaged with the system, but their engagement is difficult to measure.

It is not sufficient to define and measure engagement based solely on explicit or definitive interactions, such as clicking, because users sometimes may prefer to browse the available visible information in a content stream without explicitly clicking to view full content or details, which is particularly common on mobile and tablet platforms due to the limited screen size. In other words, measuring engagements solely based on definitive interactions does not account for use patterns involving passive browsing. For example, users who browse content without clicking on it would be considered "not engaged" according to explicit action-based metrics, despite the fact that they may spend significant time and/or browse deeply into the content stream, in either a desktop or mobile interface. In addition, content that can be consumed without clicking on it (e.g., a news article title with abstract that is read but not clicked through to the full article) cannot have their levels of engagement measured. Moreover, it is also a common browsing paradigm in Asian markets like China, Korea and Japan, where the information density of the languages leads to a more passive stream browsing patterns for users. Therefore, there is a need to provide improved solutions for measuring user engagement in personalized content recommendation to solve the above-mentioned problems.

The present teaching describes methods, systems, and programming aspects of measuring user engagement in personalized content recommendation. The present teaching describes novel user engagement metrics, including click odds, skip odds, abandon odds, stream depth, and scroll dwell time, for measuring user engagement with a personalized content recommendation system. The engagement metrics described in the present teaching are better indicators of user's both explicit interactions and implicit interactions with continuous content streams compared with the traditional metrics, such as CTR. The methods and system as described herein are capable of driving more accurate signals from user interactions with content stream, even with a passive browsing pattern, which in turn improves the recommendation quality and drives user engagement. The methods and systems as described herein allow calculating user engagement scores with respect to each piece of content using one or more novel user engagement metrics as described herein, which then may be used as a basis for inferring user interests and building user profiles for user understanding and/or selecting and ranking content for content recommendation.

In one aspect of the present teaching, user engagement is modeled by considering skipping in conjunction with clicking and session/page abandoning to obtain unbiased estimates of content popularity. The method and system in this aspect of present teaching consider various types of user action jointly, including explicit actions such as clicking and implicit actions such as skipping and abandoning, to determine the quality of content. Preliminary experiment results show a more than 5% increase of user engagement after switching ranking optimization target from CTR to the novel metrics described in this aspect the present teaching.

In another aspect of the present teaching, the method and system define and measure engagement without the use of clicking. In this aspect, user engagement measure is based on how far the user scrolls through the content stream before abandoning the stream or page. The method and system in this aspect score individual content based on position and stream depth without relying on explicit actions like clicking. Using stream depth is useful particularly when there is an infinite stream of content, which is popular on mobile devices and some desktop interfaces, and when passively browsing content is a common use pattern.

In still another aspect of the present teaching, the method and system define and measure engagement without the use of clicks. In this aspect, user engagement measure is based on the user's dwell time on the content stream when the user scrolls through the content before abandoning the stream or page, i.e., scroll dwell time. This aspect of the present teaching is available for any web-based personalization system, and can do web-scale personalization where most of the users do not login for privacy concern. The method and system in this aspect of the present teaching do not require users to click, thereby imposing no cost on the user.

Figure 12:
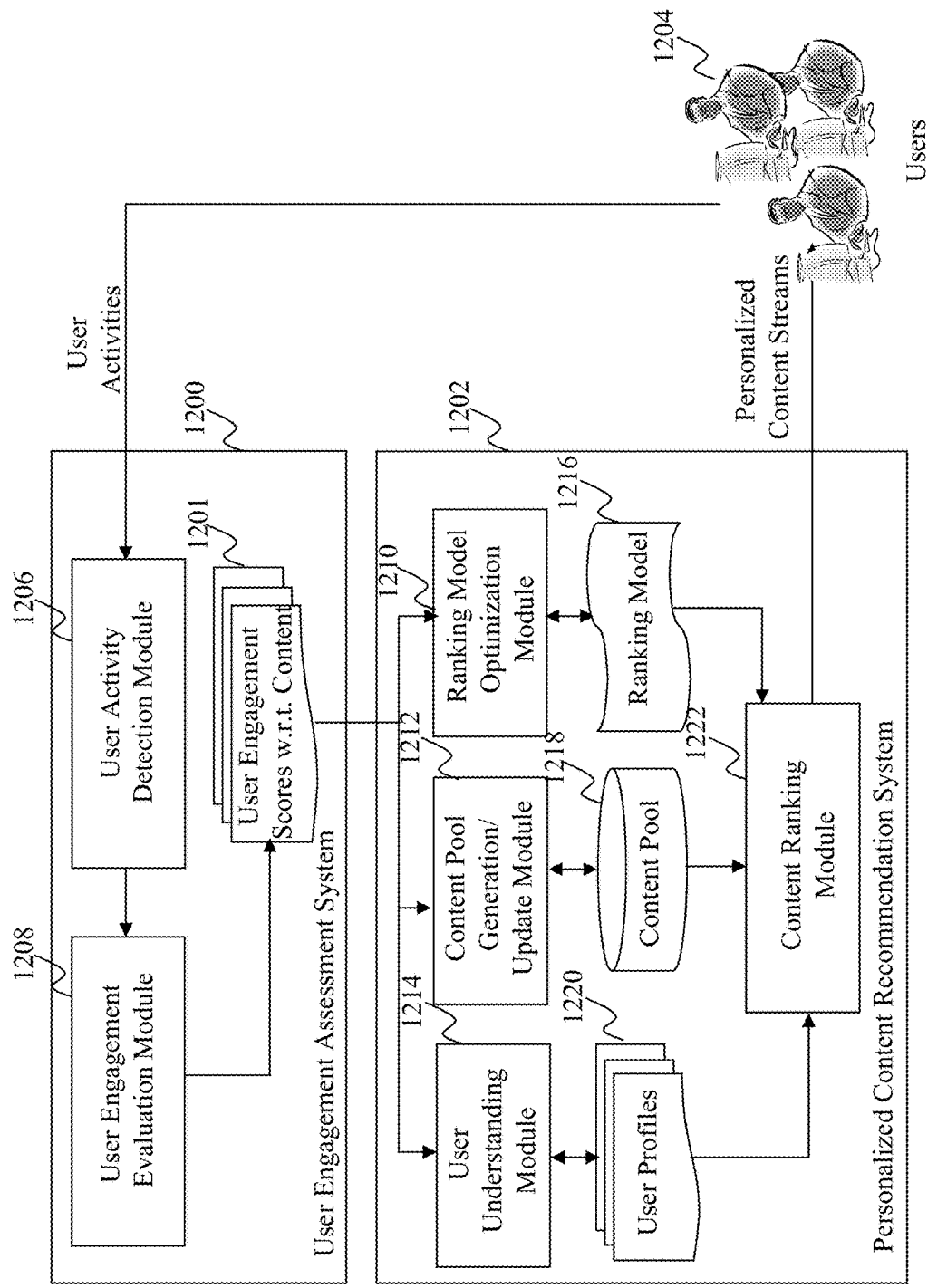
FIG. 12 is a high level exemplary system diagram of a user engagement assessment system, according to an embodiment of the present teaching.

FIG. 12 is a high level exemplary system diagram of a user engagement assessment system, according to an embodiment of the present teaching. The user engagement assessment system 1200 is configured to measure user engagement in personalized content recommendation based on user activities with respect to personalized content stream. The content referred herein includes, but is not limited to, for example, text, audio, image, video or any combination thereof. The user engagement assessment system 1200 may calculate user engagement scores 1201 (utility values) of one or more metrics, such as but not limited to, click odds, skip odds, abandon odds, stream depths, and stroll dwell times, with respect to each piece of content in a content stream and provide the user engagement scores 1201 to a personalized content recommendation system 1202. The user engagement scores 1201 may be used by the personalized content recommendation system 1202 for building user profiles and predicting user interests, selecting and updating content, and/or optimizing ranking model for content recommendation to users 1204. The user engagement assessment system 1200 in FIG. 12 may work as the user event analyzer 175 in FIG. 1 or achieve some functions of the user event analyzer 175 as described before. The personalized content recommendation system 1202 in FIG. 12 may be, for example, the personalized content recommendation module 100 in FIG. 1 or any other system, module, or unit for content personalization and recommendation.

In this example, the user engagement assessment system 1200 includes a user activity detection module 1206 for detecting different user activities with respect to personalized content stream using various techniques. The user activities may include explicit actions, such as clicking a piece of content, and implicit actions, such as viewing, skipping one or more pieces of content in a content stream, scrolling through a content stream, or abandoning a content stream or a page. The techniques used for detecting user activities may include, for example, online monitoring by web beacons (web bugs) or tool bars and offline analysis of event logs using browser-cookies.

Figure 23:
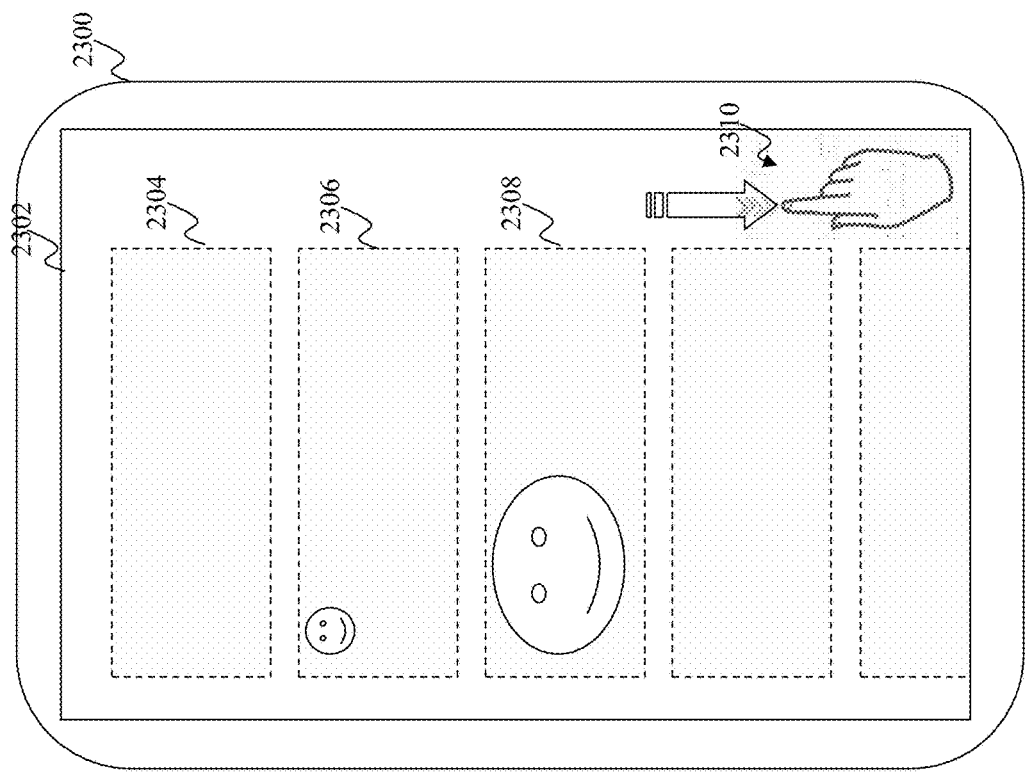
FIGS. 23-25 illustrate exemplary user activities with respect to multiple pieces of content in a content stream, according to different embodiments of the present teaching.
Figure 24:
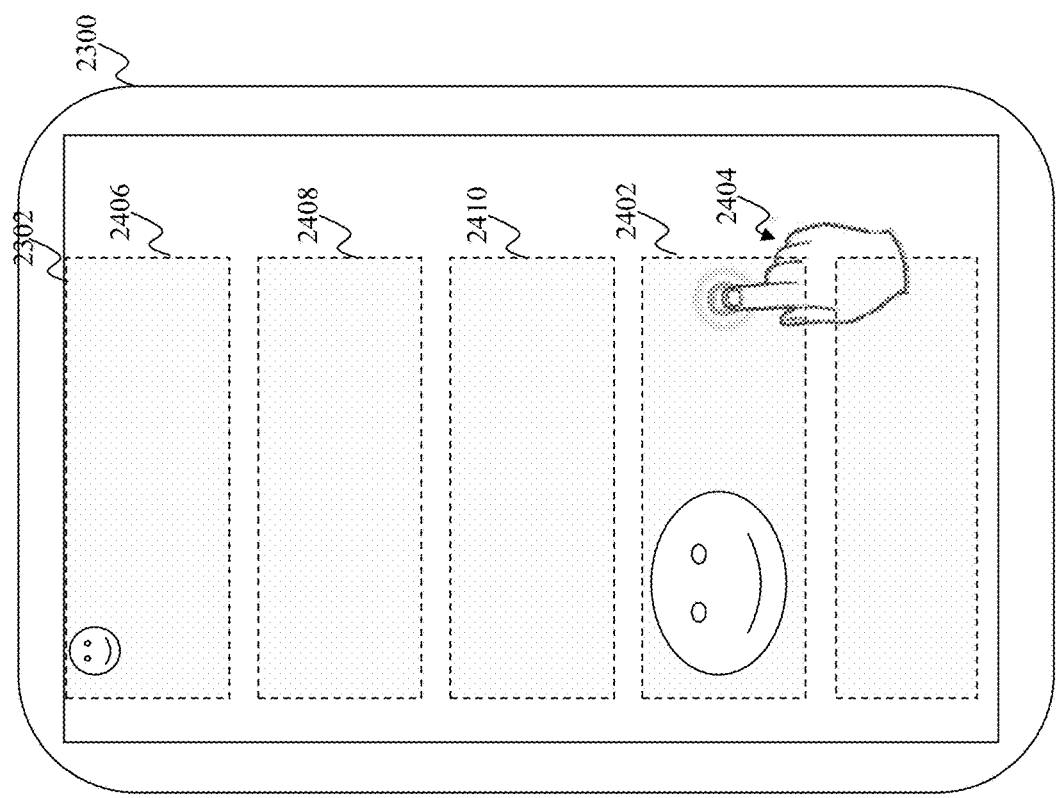
Figure 25:
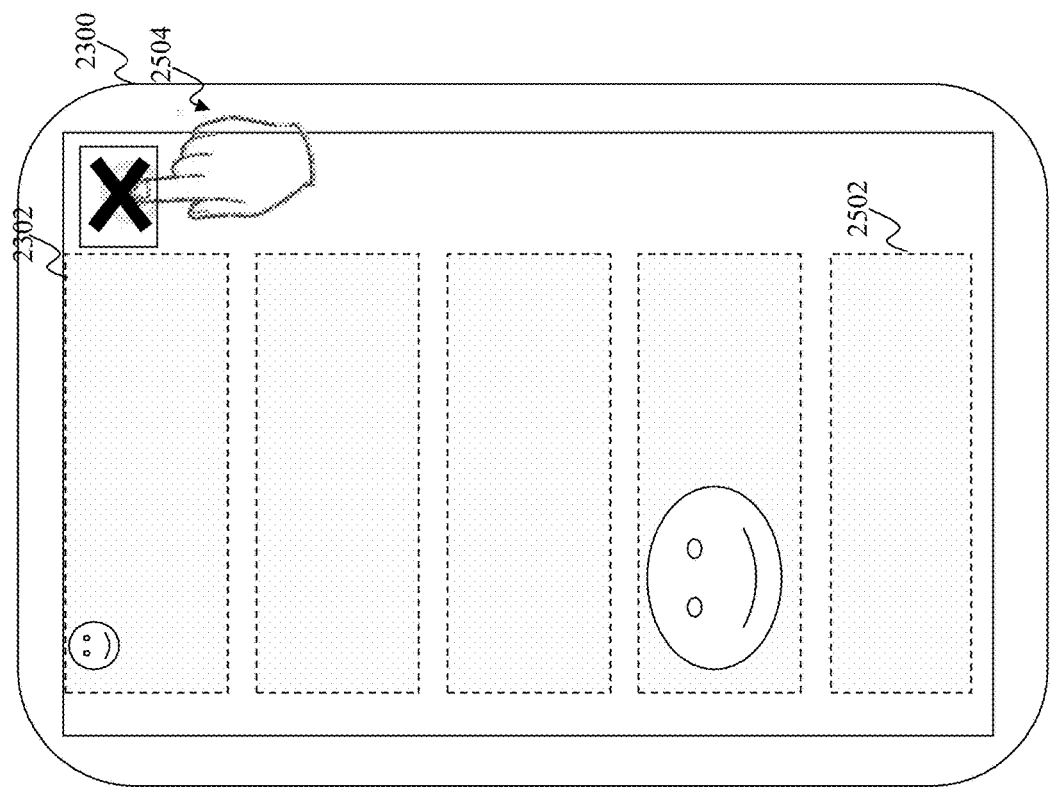

Referring now to FIGS. 23-25, exemplary user activities with respect to a content stream are illustrated. In FIGS. 23-25, content in a content stream is continuously displayed on a web page 2302 for a user via a user device 2300. In FIG. 23, each piece of content 2304, 2306, 2308 may be arranged in an order from top to bottom of the web page 2302. Depending on the screen size and/or display resolution of the user device 2300, a certain number of content items may be displayed on the web page 2302 simultaneously. Each piece of content may be associated with certain properties, such as the position (ranking) in the content stream and the presentation style. For example, the content 2304 has a position 1 as it is the first piece of content in the stream and a presentation style of "pure text"; the content 2306 has a position of 2 and a presentation style of "text plus small thumbnail"; the content 2308 has a position of 3 and a presentation style of "text plus large thumbnail." It is understood the position indicates the sequence of presenting each content item in the stream and thus, may not always increment from top to bottom if the content stream flows in a different direction, e.g., from left to right or bottom to top. It is also understood that the presentation styles are not limited to the above-mentioned examples and may be text, image, video, animation, audio, or any combination thereof. In FIG. 23, due to the limited screen size, the user needs to scroll down or up the content stream in order to view more content. The action of "scrolling" 2310 described in the present teaching may include any user actions/activities that can cause content in a content stream to be continuously presented. Scrolling may be triggered by touch screen gestures or computer mouse motion or a key press and continue without further intervention until a further user action, or be entirely controlled by input devices.

Moving to FIG. 24, the user's scrolling action causes new content to be displayed on the display screen, replacing the previous content 2304, 2306, 2308 shown in FIG. 23. The user may find a particular content 2402 interesting and want to explore the content 2402 by applying a "clicking" action on it. The action of "clicking" 2404 described in the present teaching may include any explicit actions/activities that indicate selection of a piece of content in the stream, such as but not limited to, mouse clicking, pressing/touching on touch screen, key pressing, etc. On the other hand, once a content item is clicked, all the un-clicked content items above it in the stream are considered being "skipped." Accordingly, the action of "skipping" may be introduced as an implicit user action/activity with respect to content streams. In FIG. 24, the explicit action of clicking content 2402 brings implicit actions of skipping content 2406, 2408, 2410.

Moving to FIG. 25, after checking out the details of content 2402 in FIG. 24, the user may continue to scroll down the content stream and more new content items are presented. For some reasons, when the user scrolls to content 2502, she/or he decides to abandon browsing the stream/session by, for example, closing the entire web page 2502 or an application that displays the content stream, and clicking on nothing in the content stream. The action of "abandoning" 2504 described in the present teaching may include any user actions/activities that stop a content stream. FIGS. 23-25 illustrate several user activities, e.g., clicking, scrolling, skipping, and abandoning, with respect to content in a content stream, which are monitored by the user activity detection module 1206.

Referring back to FIG. 12, the user engagement assessment system 1200 may also include a user engagement evaluation module 1208 for analyzing detected user activities and scoring individual content using one or more novel metrics as indicators of degree of engagement. Depending on the specific metric that is used, different types of user activities or combination of user activities may be measured and analyzed using different models and functions as will be described later in detail.

In this example, the personalized content recommendation system 1202 includes a ranking model optimization module 1210, a content pool generation/update module 1212, and a user understanding module 1214. The user engagement scores 1201 for each piece of content may be used by any or all of these modules 1210, 1212, 1214 for different purposes. In one example, the user engagement scores 1201 may be used as machine learning targets by the ranking model optimization module 1210 to optimize the ranking model 1216 for content ranking. In another example, the user engagement scores 1201 collected from a number of users may be used as a quality or popularity indicator by the content pool generation/update module 1212 to select content in order to build and update a content pool 1218. In still another example, the user engagement scores 1201 for a specific user may be used as a relevancy indicator by the user understanding module 1214 to infer user interests in order to build and update the user's profile 1220. The user profiles 1220, content pool 1218, and ranking model 1216 are all essential components for making accurate personalized content recommendation to the users 1204 made by a content ranking module 1222.

Figure 13:
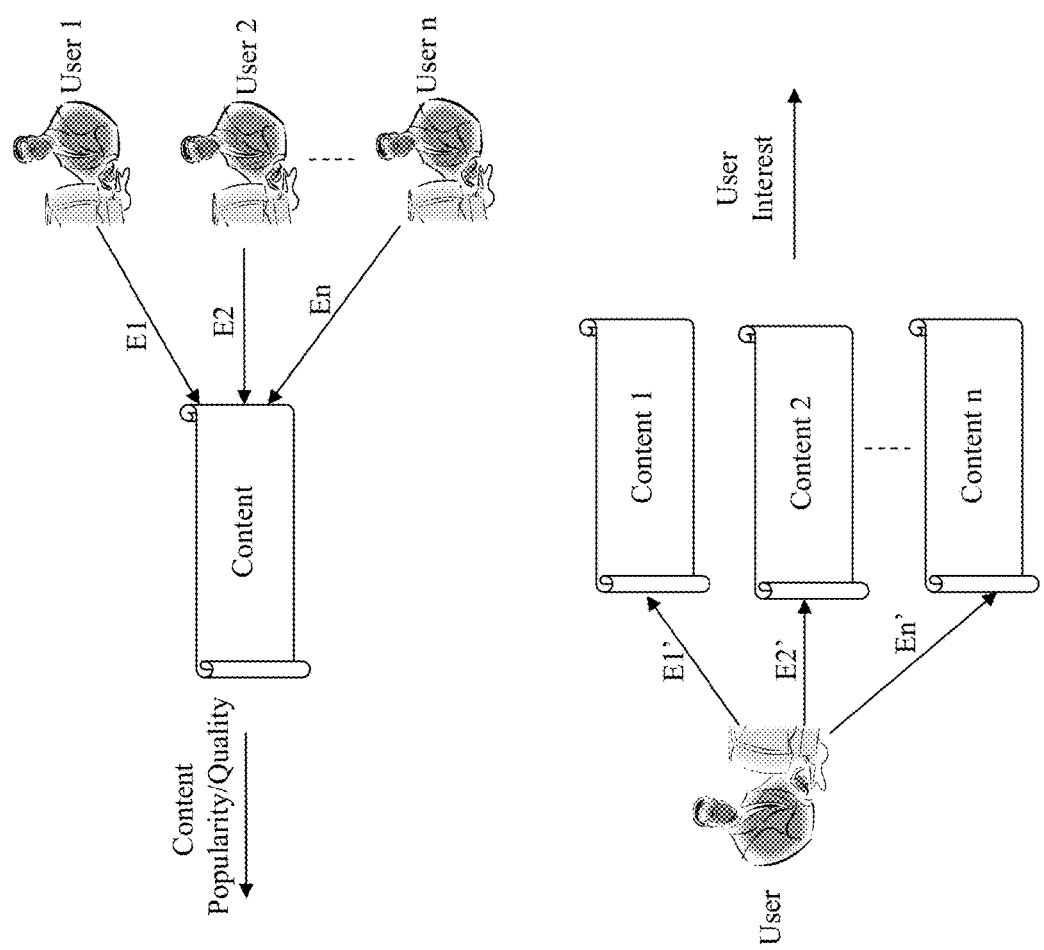
FIG. 13 depicts exemplary applications of user engagement measures, according to different embodiments of the present teaching.

FIG. 13 depicts exemplary applications of user engagement measures, according to an embodiment of the present teaching. In one embodiment, from the content's perspective, user engagement measures/scores E1, E2, . . . , En with respect to user 1, user 2, . . . , user n in a user cohort may be used to estimate popularity and/or quality of each piece of content in the user cohort. In one example, content having a high click odds and/or low skip odds and abandon odds with respect to a group of users indicate its high popularity among those users. In another example, content that is always right above where users stop the content stream (stream depth) usually has a low quality. In still another example, content on which quite a few users stay longer when scrolling through the content streams is considered to be popular among those users and have a high quality.

In another embodiment, from the users' perspective, user engagement measures/scores E1', E2', . . . , En' with respect to different pieces of content may be used to predict each user's interest. For each piece of content, the value of user engagement measures/scores indicates the user's degree of interest in the content, i.e., a degree of relevancy between the user and the content. In one example, assuming a user stops a content stream after reading 20 articles, it strongly suggests that the user is interested in the first several articles otherwise she/he would have stopped earlier. In another example, quickly scrolling down the first several articles in a content stream, i.e., a short stroll dwell time, shows a user's lack of interest in these articles. By collecting the same user's engagement measures/scores E1', E2', . . . , En' with respect to different pieces of content and analyzing the features/topics of the content, the specific user's interest may also be inferred. For example, if a user's engagement measures/scores are always high for certain articles with the same topic, it is reasonable to suggest that the user is likely interested in this topic.

Figure 14:
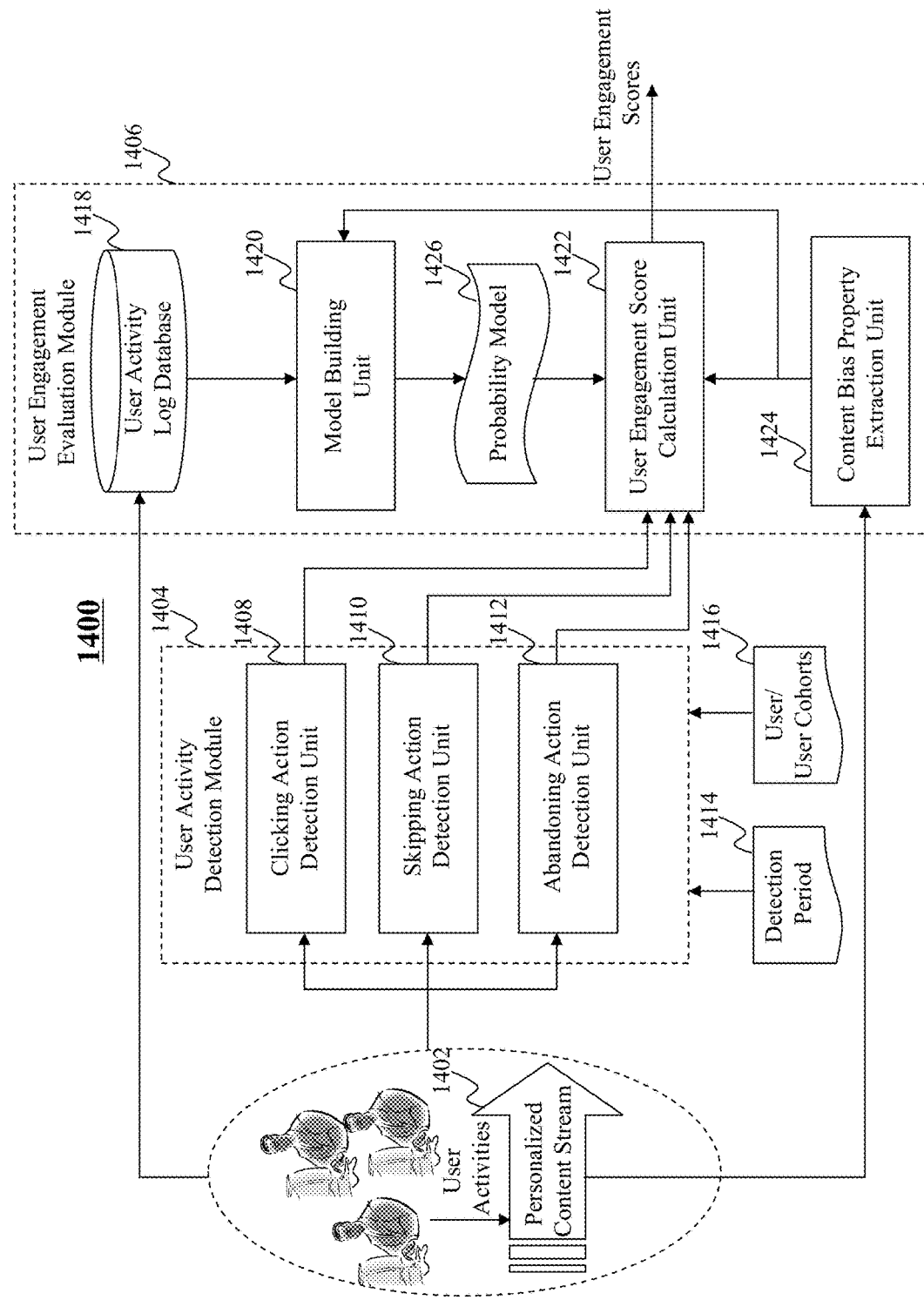
FIG. 14 is a function block diagram of one example of the user engagement assessment system shown in FIG. 12, according to an embodiment of the present teaching.

FIG. 14 is a function block diagram of one example of the user engagement assessment system shown in FIG. 12, according to an embodiment of the present teaching. In this embodiment, a user engagement assessment system 1400 is capable of estimating unbiased popularity from user activities with respect to a personalized content stream 1402. The user engagement assessment system 1400 in this embodiment captures how a particular piece of content deviates from most other content in terms of either increase or decrease engagement with the personalized content stream 1402. To measure such deviation, the user engagement assessment system 1400 calculates user engagement scores, e.g., odds ratio including click odds, skip odds, and abandon odds, with respect to each piece of content. In this embodiment, the user engagement assessment system 1400 includes a user activity detection module 1404 for detecting user activities, including clicking, skipping, and abandoning actions, and a user engagement evaluation module 1406 for computing the user engagement scores, including click odds, skip odds, and abandon odds.

In this embodiment, the user activity detection module 1404 includes a clicking action detection unit 1408, a skipping action detection unit 1410, and an abandoning action detection unit 1412, which are configured to detect clicking, skipping and abandoning actions, respectively. The clicking, skipping and abandoning actions with respect to the personalized content stream 1402 have been described before with respect to FIGS. 23-25. In this embodiment, the clicking action is assumed to be a vote of relevancy from the users and is a positive signal, whereas skipping and abandoning actions imply that the uses find the content less or totally irrelevant and thus are negative signals. The detections of the user activities may be performed over a detection period 1414 for general users or a user cohort 1416, i.e., a group of users determined based on, for example, demographics, visit patterns, on page behaviors, or any other user profile. It is understood that the detections may be done over an extended time period for creating event logs for offline analysis or done in near real-time for computing the user engagement scores for a particular piece of content.

In this embodiment, the user engagement evaluation module 1406 includes a user activity log database 1418, a model building unit 1420, a user engagement score calculation unit 1422, and a content bias property extraction unit 1424. The user activity log database 1418 in this embodiment stores user events, including clicking, skipping, and abandoning actions, detected over the detection period 1414, which covers a significant user base and content pool. The model building unit 1420 is responsible for building a probability model 1426 for average content based on the data from the user activity log database 1418. The details of building the probability model 1426 will be described later in FIG. 15. The user engagement score calculation unit 1422 then receives data of user activities, including clicking, skipping, and abandoning actions, in near real-time and calculates click odds, skip odds, and abandon odds, respectively, based on the probability model 1426.

It is understood that some properties of the content, such as the position in the stream and presentation style (format), may introduce bias in user engagement measurement. For example, an article presented with a big thumbnail may be visually attractive for a user to click even though the user may not be really interested in the topic of that article. In some examples, the bias caused by the content bias properties needs to be considered by the model building unit 1420 in building the probability model 1426 and/or by the user engagement score calculation unit 1422 in computing the user engagement scores. The content bias property extraction unit 1424 is configured to extract those properties for each piece of content such that the impact thereof may be captured and eliminated in order to measure an unbiased popularity of the content.

Figure 15:
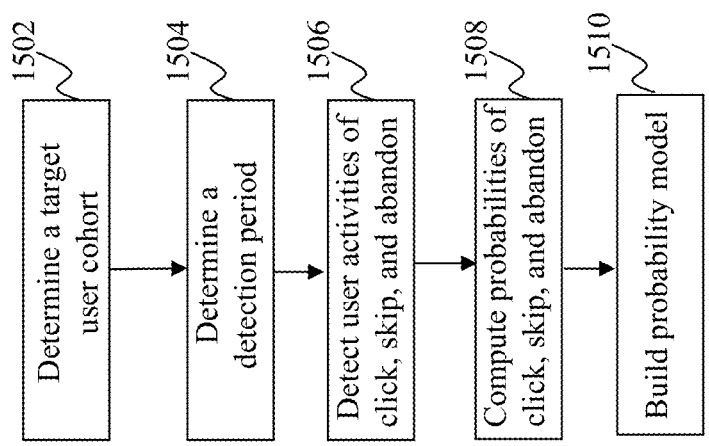
FIGS. 15-16 are flowcharts of an exemplary process of the user engagement assessment system shown in FIG. 14, according to different embodiments of the present teaching.
Figure 16:
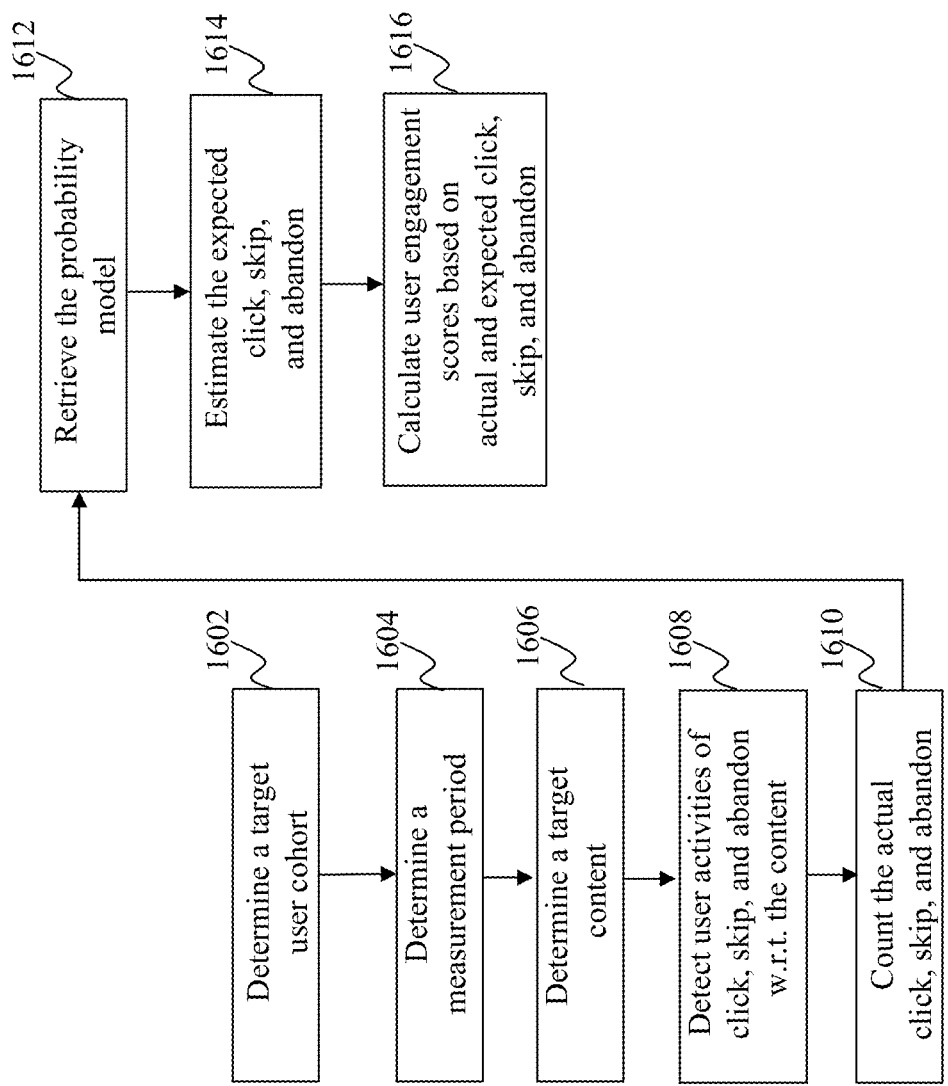

FIGS. 15-16 are flowcharts of an exemplary process of the user engagement assessment system shown in FIG. 14, according to different embodiments of the present teaching. FIG. 15 illustrates one example of building the probability model 1426 in FIG. 14. Starting from 1502, a target user cohort is first determined. That is, the probability model may be build for a specific type of users based on their demographics, visit patterns, on page behaviors or any other user profiles. It is understood that 1502 may not be necessary if the probability model is built for general users, and the target users could be all the users who have interacted with the content stream in the detection period or users who have been randomly picked up. At 1504, a detection period is also determined. In one example, the detection period may be an extended period of time, e.g., one month, which covers a significant user base and content pool.

Moving to 1506, user activities including clicking, skipping and abandoning actions are monitored during the detection period for the user cohort or general users. As described before, content bias properties such as position and presentation style may be also extracted and recorded. In one example, each content item d is associated with a position i, which is a non-negative integer denoting the item's rank in the stream. For example, the top item in the stream is in position 1, and the slot immediately below is position 2, etc. Each content item is also presented using one of the predefined presentation styles (formats) indicated by j. For example, the presentation styles may include (1) pure text only, (2) text plus small thumbnail, and (3) text plus big thumbnail. Upon examining a content item d at position i in presentation style j, a user may perform one of the three following actions: (1) click on d, (2) skip d and start examining the following article, and (3) abandon the session (i.e. click on nothing in the stream). The numbers of occurrence of these three types of events involving item d at position i in presentation style j may be represented as $C_{dij}$, $S_{dij}$, and $A_{dij}$, respectively. It is understood that the clicking, skipping and abandoning actions referred herein are not limited to specific user actions and may include various user actions that may cause the same or similar effect as "clicking," "skipping," and "abandoning" in different applications, user interfaces, operating system and/or user devices. For example, in some user interfaces or applications, hovering over a piece of content or gazing on the content over a certain period of time may have the same effect as clicking on the content, i.e., selecting the content, and thus, are also considered as a clicking action in the present teaching.

At 1508, the monitored data, i.e., event logs from browser-cookies may be consolidated and analyzed to compute probabilities of clicking, skipping and abandoning actions. The probabilities may be calculated as specific numbers, or parameters that need to be estimated. In the above-mentioned example, using the event logs over an extended period of time, which covers a significant user base and content pool, the following probabilities may be computed:

$$P(\text{click}|i, j) = \frac{\#\text{times any items got clicked at position } i \text{ in format } j}{\#\text{times any items got presented at position } i \text{ in format } j} \quad (1)$$

$$P(\text{skip}|i, j) = \frac{\#\text{times any items got skipped at position } i \text{ in format } j}{\#\text{times any items got presented at position } i \text{ in format } j} \quad (2)$$

$$P(\text{abandon}|i, j) = \frac{\#\text{times any items got abandoned at position } i \text{ in format } j}{\#\text{times any items got presented at position } i \text{ in format } j} \quad (3)$$

At 1510, the probabilities model is built based on the probabilities. In the above-mentioned example, the three probabilities may be referred to as a bias probability model, as it captures the impact of positions and presentation styles on user behaviors regardless of the items. It is understood that variations of the probabilities model described in Equations 1-3 may be made in some examples. In one example, in addition to position and presentation style (format), time dependency may also be included as another bias such that each event may be weighted to take into account of position, presentation style (format), and/or time dependency. In another example, a prior may be added in the numerator and denominator in Equations 1-3 to smooth out cases with low counts.

FIG. 16 illustrates one example of calculating user engagement scores with respect to each piece of content based on the probability model 1426 in FIG. 14. Starting from 1602, a target user cohort is first determined. The user engagement scores may be designated to a specific user cohort or even a specific user if desired. It is understood that 1602 may not be necessary if the user engagement scores are for general users. At 1604, a detection period is also determined. In one example, the detection period may be shorter than the detection period for building the probability model in FIG. 15. For example, the detection period in 1604 may be one day. Moving to 1606, a target content item is determined. As the user engagement scores are with respect to each specific piece of content, the target content may be determined first.

At 1608, user activities including clicking, skipping and abandoning actions are monitored during the detection period for the user cohort or general users. As described before, content bias properties, such as position and presentation style, may be also extracted and recorded. At 1610, the actual numbers of occurrence of each of the clicking, skipping and abandoning actions are counted, and the probability model is retrieved at 1612. Moving to 1614, each expected number of occurrence of clicking, skipping, and abandoning actions is estimated, for example, based on the total number of occurrences of the three types of actions and the probability model. Eventually, at 1616, user engagement scores for the target content are calculated based on the actual occurrences of each of the clicking, skipping and abandoning actions and their corresponding expected occurrences.

Referring to the example mentioned in FIG. 15, the user engagement scores are odds ratio including click odds ($\gamma_{d,click}$), skip odds ($\gamma_{d,skip}$), and abandon odds ($Y_{d,abandon}$), each of which is respectively computed as following:

$$\gamma_{d,click} = \frac{\sum_{i,j} C_{dij}}{\sum_{i,j} P(\text{click}|i, j)(C_{dij} + S_{dij} + A_{dij})} \quad (4)$$

$$\gamma_{d,skip} = \frac{\sum_{i,j} S_{dij}}{\sum_{i,j} P(\text{skip}|i, j)(C_{dij} + S_{dij} + A_{dij})} \quad (5)$$

$$\gamma_{d,abandon} = \frac{\sum_{i,j} A_{dij}}{\sum_{i,j} P(\text{abandon}|i, j)(C_{dij} + S_{dij} + A_{dij})}, \quad (6)$$

where the numerators in $Y_{d,click}$ ($\gamma_1(d, \text{skip})$ $\gamma_1(d,\text{abandon})$) is the actual total number of clicks (skips, abandons) received by item d, whereas the denominator is the expected number of clicks (skips, abandons) an average item is expected to receive when being shown at different positions using different presentation styles the same number of times as the target item d.

A high value in $\gamma_{d,click}$ is therefore a positive indicator of item d's popularity, since it indicates d is driving more clicks than an average item. In contrast, $\gamma_{d,skip}$ and $\gamma_{d,abandon}$ are supposed to negatively correlate with item d's popularity. The system and method disclosed in this embodiment allow measuring CTR in a relative scale (odds ratio) rather than absolute scale (probability between 0.0 and 1.0). For example, suppose it is found that the average CTR at position 1 is 1% (probability model) and there is a new article today that has been shown at position 1 for 1,000 times and received 100 clicks (actual occurrences of clicks). Based on the average CTR, the expected occurrences of clicks which this new article shall receive is 1000*1%=10. In this case, the click odds is 100/10=10, which indicates that this new article obtained 9 times more clicks than expected and is therefore extremely popular.

In the personalized content recommendation system, the counts $C_{dij}$, $S_{dij}$, and $A_{dij}$ may be regularly updated using the latest event logs. The values of the click, skip, and abandon odds may also be recomputed for each piece of content, and then fed into the index of the ranking system, which uses a machine learned ranking function to score items by combining these three features along with other features using the machine learned ranking function.

Figure 17:
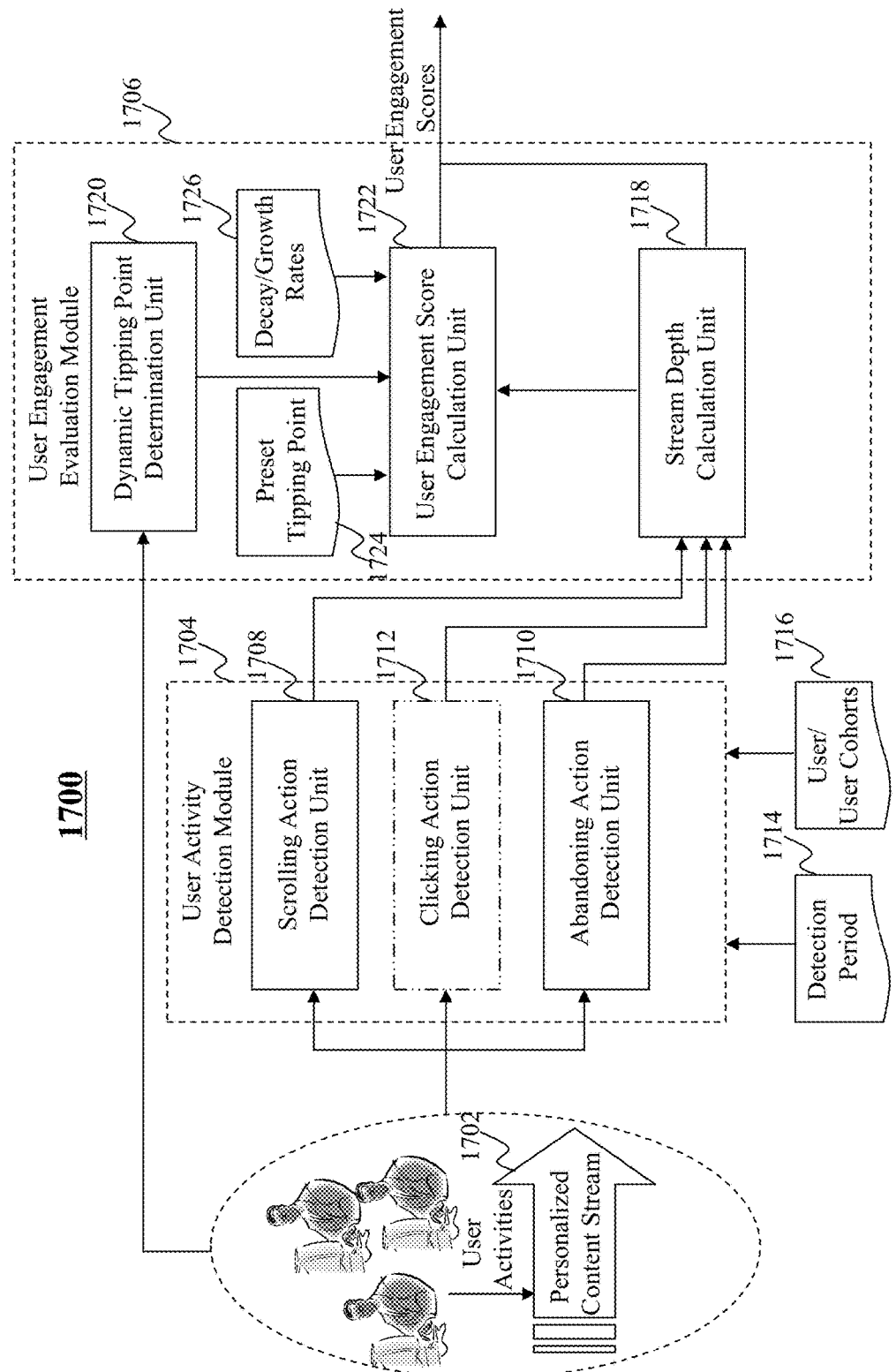
FIG. 17 is a function block diagram of another example of the user engagement assessment system shown in FIG. 12, according to an embodiment of the present teaching.

FIG. 17 is a function block diagram of another example of the user engagement assessment system shown in FIG. 12, according to an embodiment of the present teaching. In this embodiment, a user engagement assessment system 1700 is capable of measuring user engagement from stream depth. The stream depth referred herein may be the largest number of ranked content items that a user is known to have viewed in a content stream. The user engagement assessment system 1700 in this embodiment enables the engagement measurement of users who may not provide explicit actions in the personalized content stream 1702. The user engagement assessment system 1700 in this embodiment also enables measuring the engagement value of content in the personalized content stream 1702 that may be consumed in part without explicit actions taken by users. Based on the stream depth and position of each content item in the personalized content stream 1702, the user engagement assessment system 1700 scores individual content by generating user engagement scores. In this embodiment, the user engagement assessment system 1700 includes a user activity detection module 1704 for detecting user activities that are used for determining stream depth, including scrolling and abandoning actions, and a user engagement evaluation module 1706 for computing the user engagement scores based on the determined stream depth.

In this embodiment, the user activity detection module 1704 includes a scrolling action detection unit 1708 and an abandoning action detection unit 1710, which are configured to detect scrolling and abandoning actions, respectively. Optionally, a clicking action detection unit 1712 may be included to detect explicit actions such as clicking. The clicking, scrolling and abandoning actions with respect to the personalized content stream 1702 have been described before with respect to FIGS. 23-25. Optionally, the detections of the user activities may be performed over a detection period 1714 for general users or a user cohort 1716, i.e., a group of users determined based on, for example, demographics, visit patterns, on page behaviors, or any other user profile. It is understood that the detections may be done by any known techniques, such as receiving signals from a web beacon or tool bar from the user's web browser or any application that renders the personalized content stream 1702.

In this embodiment, the user engagement evaluation module 1706 includes a stream depth calculation unit 1718, a dynamic tipping point determination unit 1720, and a user engagement score calculation unit 1722. The stream depth calculation unit 1718 is configured to calculate the stream depth of the personalized content stream 1702. In one example, the stream depth is a function of the following:

1. the number of content items visible by default on the user's page before any actions are taken;
2. the position of the lowest content item explicitly interacted with by the user, e.g., being clicked, if any; or
3. the position of the lowest content item that the user scrolls to, e.g., detected by a web beacon.

An example of this function may be taking the maximum of the three numbers above. In one example, assuming no explicit action has been detected (condition 2) and no scrolling action has been detected (condition 3), then the stream depth is the number of content items displayed on the screen (condition 1), which is typically determined by the display screen size and/or display resolution. In another example, if the user scrolls down to content number 18 (condition 3) in the stream without clicking any content (condition 2) and only 4 content items can be displayed at the same time on the display screen (condition 1), then the stream depth in this case is 18. It is understood that, the stream depth itself may be used directly as a measure of engagement, without regard for intermediate actions taken, number of actions taken, or other behaviors on the page.

In this embodiment, the user engagement score calculation unit 1722 may provide a score for individual content in the stream based on the stream depth from the stream depth calculation unit 1718. In this example, a scoring function may be applied by the user engagement score calculation unit 1722, which is constructed based on the stream depth, tipping point, and decay and growth rates 1726. The tipping point may indicate how far above the abandonment (stream depth) to switch from a positive score to a negative score, i.e., the zero point in the scoring function. In one example, the tipping point may be a preset tipping point 1724 determined based on the number of content items that can be displayed on the screen at the same time or based on number of content items that can be presented in a specific area on page for displaying the personalized content stream 1702. For example, the preset tipping point 1724 may be predetermined based on the statistics of the average users' screen size and/or display resolution or the size of the area for displaying the personalized content stream 1702. If it is determined that, most of the user's display screen can have 5 content items displayed simultaneously, then the preset tipping point may be 5. In another example, the tipping point may be dynamically determined by the dynamic tipping point determination unit 1720 based on user's behaviors. For example, measurements associated with user's scrolling actions, such as scrolling speed and acceleration, may be considered by the dynamic tipping point determination unit 1720 to determine a dynamic tipping point to predict the user's intent behind the action. For instance, if it is detected that the user suddenly accelerates the scrolling speed when she/he is reading content number 5 and eventually abandons the stream at content number 8, then the tipping point in this case may be set at content number 5. The details of the scoring function will be described later in FIG. 19.

Figure 18:
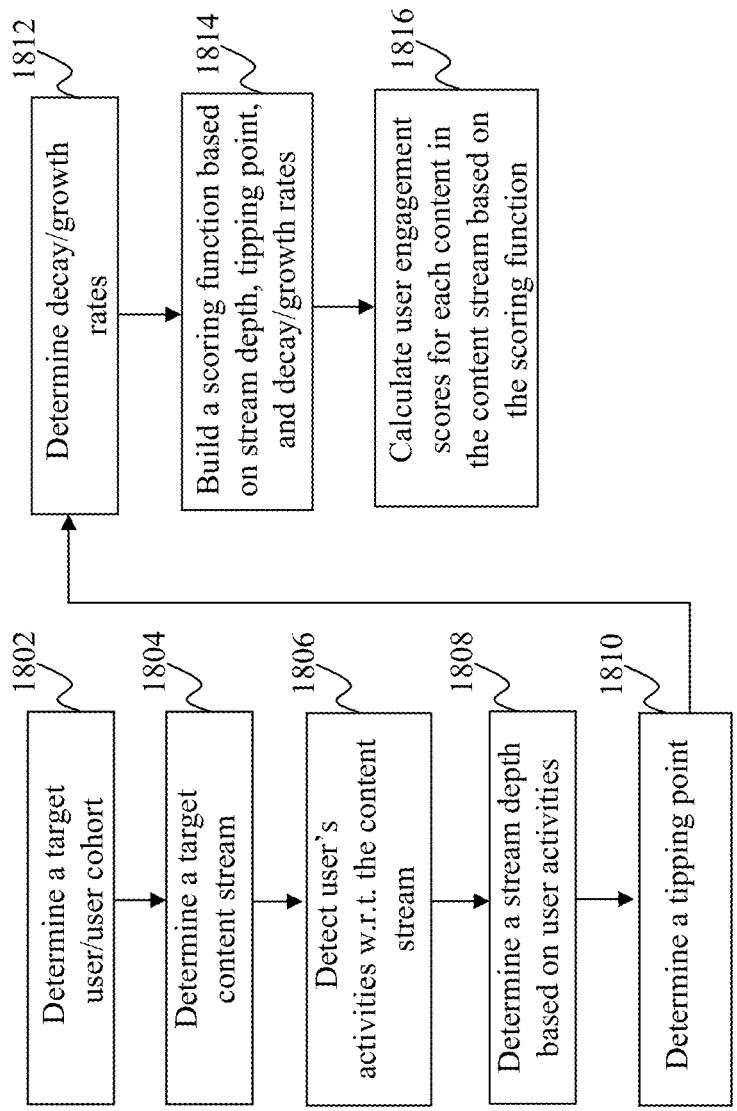
FIG. 18 is a flowchart of an exemplary process of the user engagement assessment system shown in FIG. 17, according to an embodiment of the present teaching.

FIG. 18 is a flowchart of an exemplary process of the user engagement assessment system shown in FIG. 17, according to an embodiment of the present teaching. Starting from 1802, a target user or user cohort is first determined. The user engagement scores may be designated to a specific user or a specific user cohort. It is understood that 1802 may not be necessary if the user engagement scores are for general users. At 1804, a target content stream is determined. As the user engagement scores are with respect to each piece of content in the content or the content stream itself, the target content and/or content stream may be determined first. Moving to 1806, user's non-clicking activities with respect to the content stream, such as scrolling and abandoning actions may be detected. Optionally, the user's clicking actions may also be detected and recorded.

At 1808, a stream depth is determined based on the detected user activities. The stream depth referred herein may be the largest number of ranked content items that a user is known to have viewed in a content stream. At 1810, a tipping point may be determined based on a preset value, for example, the maximum number of content items displayed on the screen or on the area for displaying the personalized content stream 1702. The tipping point may also be dynamically determined based on an estimation of user's intent behind the user's activities, e.g., accelerating the scrolling speed. At 1812, decay and growth rates are also determined for constructing a scoring function. The decay rate may indicate how steeply to decay the scores at the top of the stream as approaching the tipping point. The growth rate may indicate how steeply to penalize the content items located between the tipping point and the abandonment point (stream depth).

At 1814, a scoring function is built based on the stream depth, tipping point, and decay and growth rates. The scoring function may be a linear function, a non-linear function, e.g., an exponential function, a logarithmic function, etc., or any combination thereof. In one example, the goal of the scoring function is to provide a high score to items at the top of the page, and a negative score to the last several content items viewed by the user in the stream. At 1816, user engagement scores for each content item in the stream are calculated based on the scoring function and their respective positions in the content stream. For example, a scoring function defines the relationship between positions in the stream and the engagement scores (utility values). Once the scoring function is constructed, each content item may be mapped to the score dimension based on their respective positions in the stream.

Figure 19:
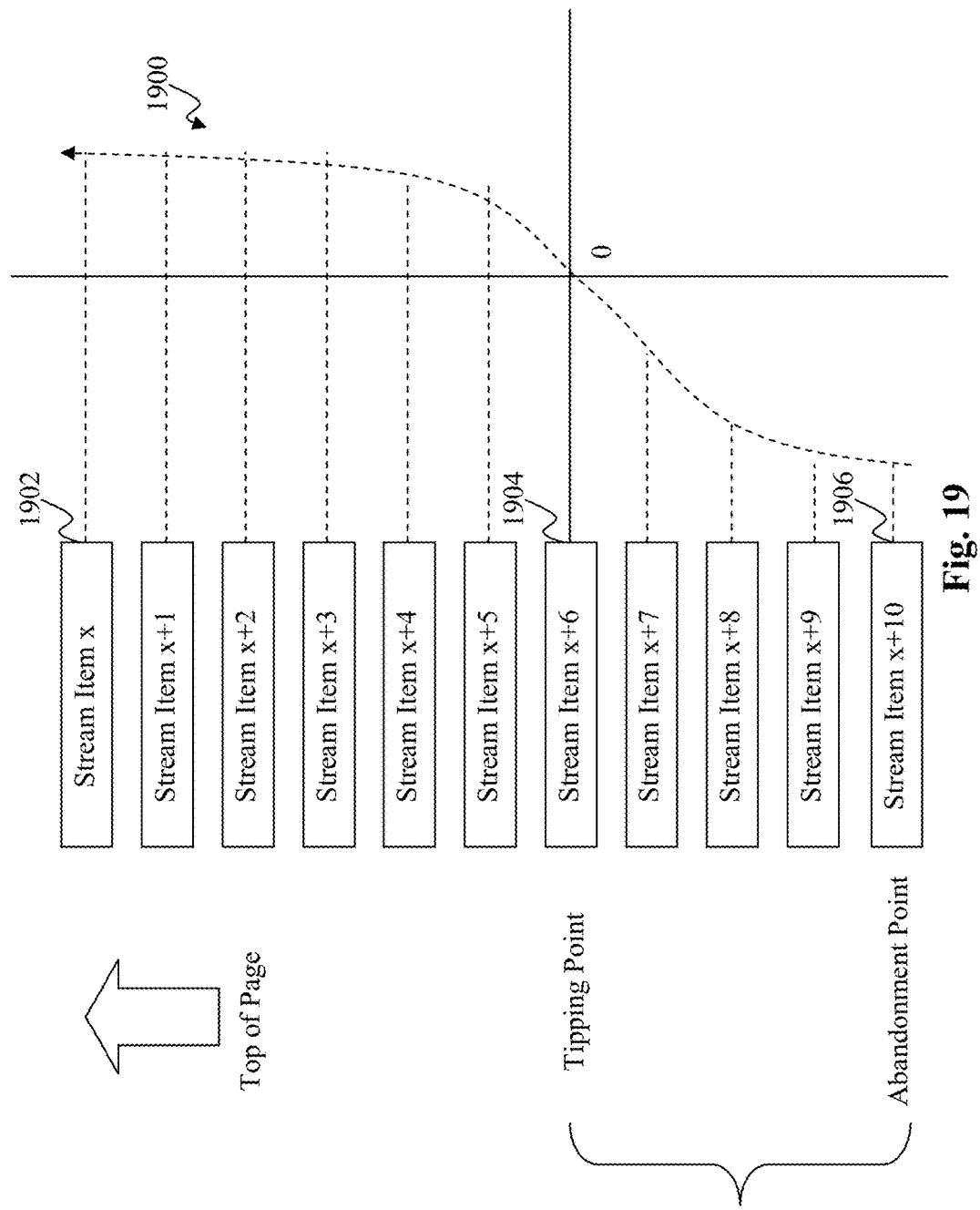
FIG. 19 illustrates an exemplary function of measuring user engagement based on stream depth, according to an embodiment of the present teaching.

Referring now to FIG. 19, an exemplary scoring function 1900 is illustrated. In this example, the content item 1902 at the very top of the page is item x. The intuition for the scoring function 1900 is that if item x is engaging for the user, the user will continue to follow the stream to see item x+1, item x+2, etc. If, however, the user encounters several items in a row, e.g., item x+6 1904 (tipping point), item x+7, item x+8, that are of low quality, the user may abandon her/his interaction with the stream at the abandonment point (stream depth), e.g., item x+10 1906 (last content item viewed). Thus, the content items near the bottom of the stream, which are near the abandonment point, are given large negative scores, while the content items near the top of the stream, which are far away from the abandonment point, are given large high positive scores. Also, the content item 1904 at the tipping point gets zero score by the definition of the tipping point. In the example of FIG. 19, the tipping point may be determined as four content items above the abandonment point based on the maximum number of the content items that can be displayed at the same time on the screen or the area for displaying personalized content stream. As the abandonment point in this example is at the item x+10 1906, the content at the tipping point is four items above, i.e., item x+6 1904. It is understood that, if it is dynamically monitored that the user starts to accelerate her/his scrolling speed at item x+6 1904, then item x+6 1904 may also be dynamically set as the tipping point regardless of the screen size and/or display resolution. Once the abandonment point (stream depth), tipping point, and decay and growth rates are set, the scoring function 1900 is built as shown in FIG. 19, which defines the relationship between the positions in the stream and the engagement scores (utility values). Once the scoring function 1900 is constructed, each content item may be mapped to the score dimension based on their respective positions in the stream.

Figure 20:
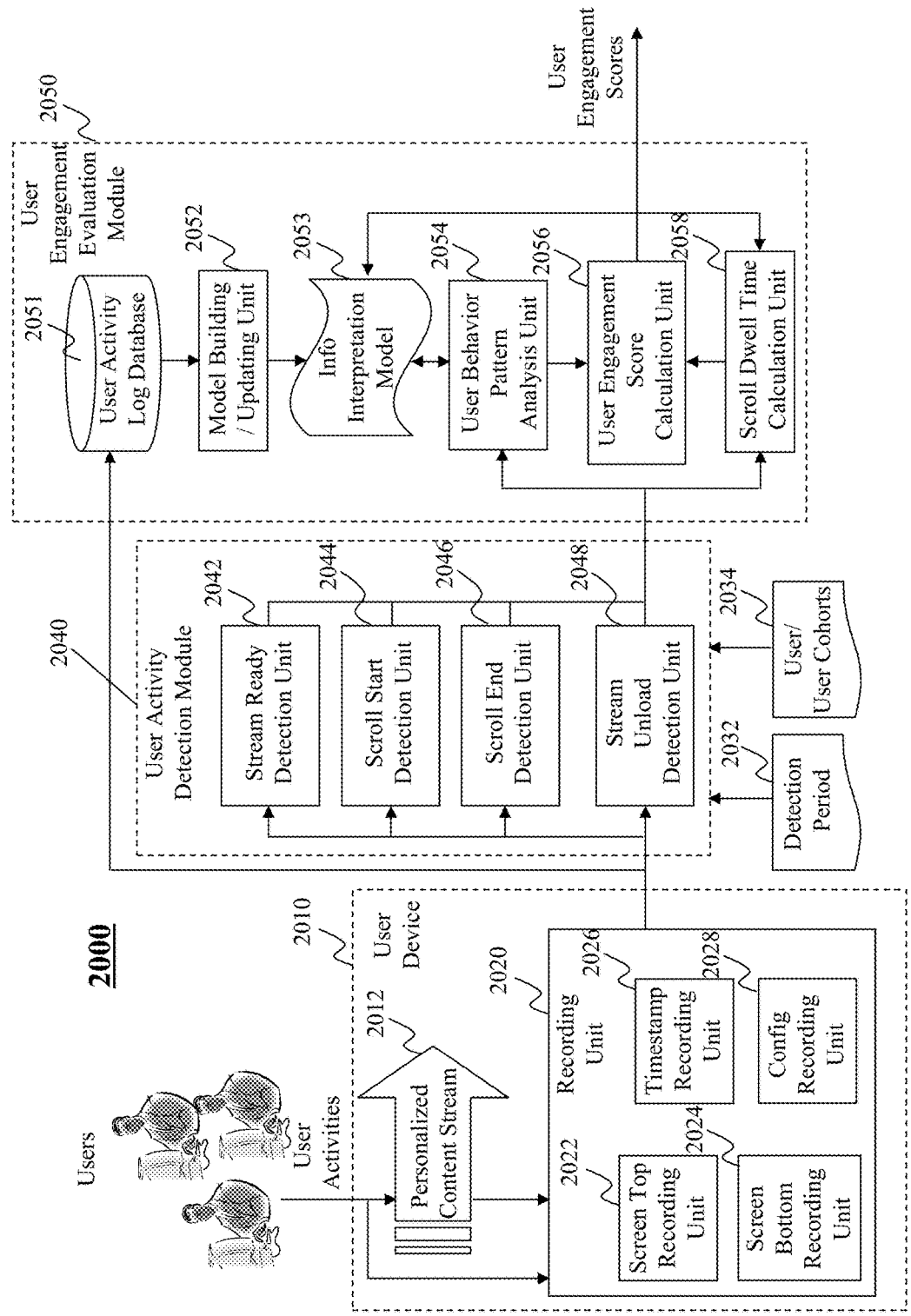
FIG. 20 is a function block diagram of still another example of the user engagement assessment system shown in FIG. 12, according to an embodiment of the present teaching.

FIG. 20 is a function block diagram of still another example of the user engagement assessment system shown in FIG. 12, according to an embodiment of the present teaching. The user engagement assessment system 2000 in this example includes a user device 2010, a user activity detection module 2040, and a user engagement evaluation module 2050. On the user device 2010, a personalized content stream 2012 may be presented to a user. The personalized content stream 2012 may have been personalized based on some estimated interests of the user. Upon obtaining the personalized content stream 2012, a user may act with respect to the personalized content stream 2012. The user activities from one or more users may be detected by the user activity detection module 2040. Based on the user activities, the user engagement evaluation module 2050 may evaluate a user's engagement by calculating a user engagement score.

In this example, the user device 2010 may include a recording unit 2020 for recording information associated with activities of the one or more users, information associated with the personalized content stream 2012, and/or information associated with the user device 2010. The recording unit 2020 may include some sub-units, e.g., a screen top recording unit 2022, a screen bottom recording unit 2024, a timestamp recording unit 2026, and a configuration recording unit 2028. The screen top recording unit 2022 may record the position at the top of a screen on the user device 2010, when an event happens at the user device 2010. The event may happen due to a user activity performed with respect to the personalized content stream 2012. For example, the screen on the user device 2010 may display different pieces of content in the personalized content stream 2012, as the user scrolls through the content in the personalized content stream 2012.

The screen bottom recording unit 2024 may record the position at the bottom of the screen on the user device 2010, when the event happens at the user device 2010. In some embodiments, when some portion of the screen on the user device 2010 is not visible to a user, the position recorded by the screen top recording unit 2022 and screen bottom recording unit 2024 may be the positions at the top and bottom of a visible portion of the screen, respectively. The timestamp recording unit 2026 may record a timestamp when the event happens at the user device 2010. The configuration recording unit 2028 may record configuration information associated with the user device 2010, e.g., the size of the screen on the user device 2010, device identification (ID) of the user device 2010, or associated with a user, e.g., a user ID of a logged-in user, browser-cookies for identifying each logged-in or non-logged-in user.

The user activity detection module 2040 may detect, via the recording unit 2020 on the user device 2010, events associated a target user or user cohort 2034, within a detection period 2032. The detection period 2032 may be determined based on previous measurements of user engagement. The target user cohort 2034 may include a group of users determined based on, for example, demographics, visit patterns, on page behaviors, or any other user profile. In different examples, the events detected by the user activity detection module 940 may be associated with some implicit user activities like scrolling and dwelling on the screen, in comparison to explicit user activities like clicking and sharing.

The user activity detection module 2040 in this embodiment, includes a stream ready detection unit 2042, a scroll start detection unit 2044, a scroll end detection unit 2046, and a stream unload detection unit 2048. The stream ready detection unit 2042 may detect a stream ready event, when the content stream 2012 is ready and starts being presented to the user. The scroll start detection unit 2044 may detect a scroll start event, when the user starts to scroll through the content in the content stream 2012. The scroll end detection unit 2046 may detect a scroll end event, when the user stops scrolling. The stream unload detection unit 2048 may detect a stream unload event, when the user discards the content stream 2012. The personalized content stream 2012 may be discarded (abandoned) either due to a closing of the personalized content stream 2012 or a leaving from the personalized content stream 2012 to other content. It can be understood that in some examples, one or more of the events above cannot be detected. For example, the user may be so deeply engaged in the personalized content stream 2012 that the user never unloads the personalized content stream 2012.

The user engagement evaluation module 2050 in this example includes a model building/updating unit 2052, a user behavior pattern analysis unit 2054, a scroll dwell time calculation unit 2058, and a user engagement score calculation unit 2056. The scroll dwell time calculation unit 2058 may calculate a scroll dwell time based on information obtained from the user activity detection module 2040 and an information interpretation model 2053.

Figure 22:
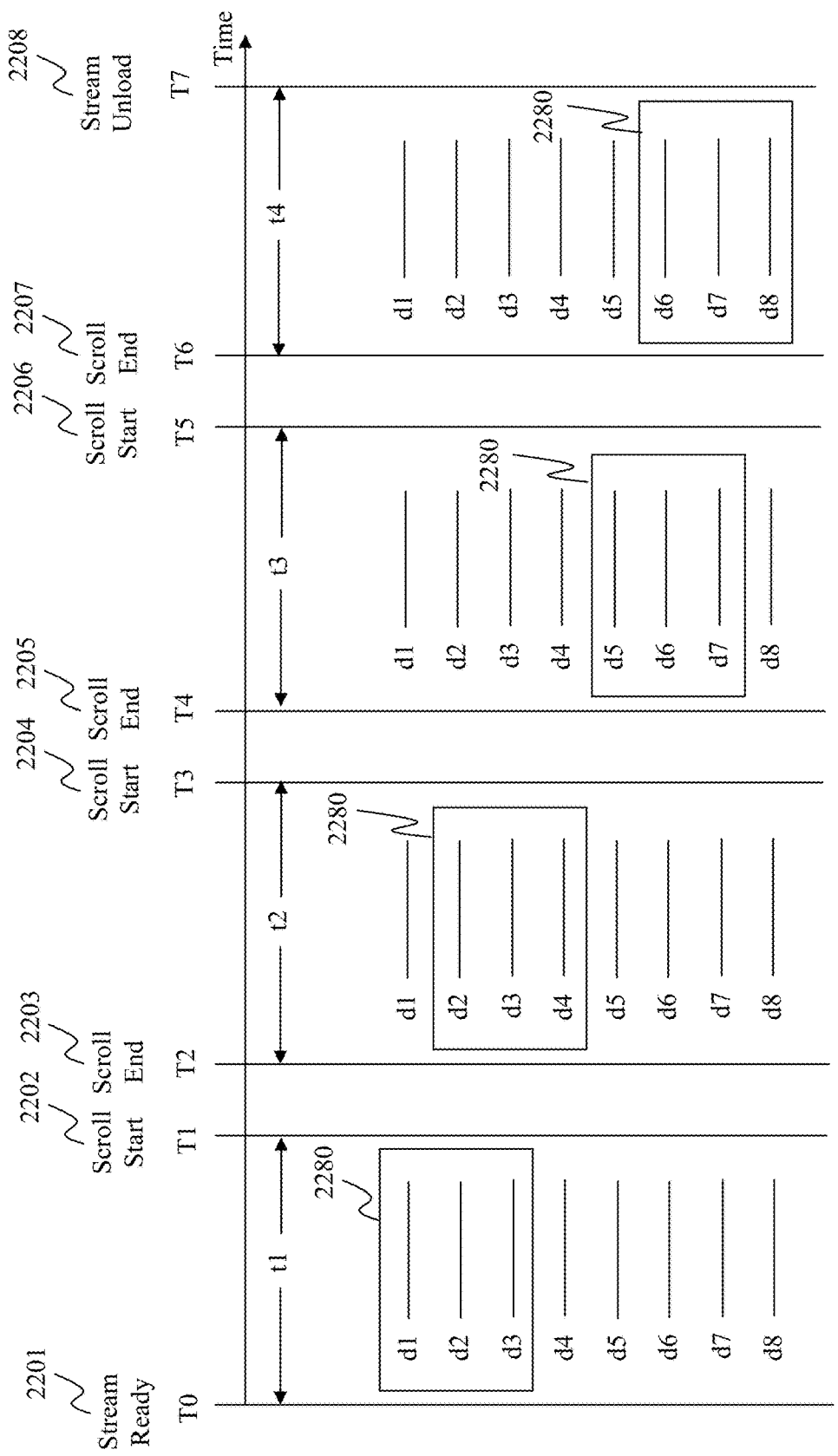
FIG. 22 depicts an exemplary content stream presented in different time periods, according to an embodiment of the present teaching.

Referring now to FIG. 22, an exemplary content stream presented in different time periods is illustrated. In this example, there are eight pieces (d1, d2, . . . , d8) of content in the personalized content stream 2012 to be presented to the user. The detection period 2032 in this example, starts at T0 2201, when the personalized content stream 2012 is ready, and ends at T7 2208, when the personalized content stream 2012 is discarded. There are also three scrolling actions detected within the detection period 2032 in this example, one from T1 2202 to T2 2203, one from T3 2204 to T4 2205, and another one from T5 2206 to T6 2207. Within each time period between two scrolling actions, a visible portion 2280 on the screen of the user device 2010 may cover different pieces of content. For example, during time period t1, the visible portion 2280 covers d1, d2, and d3; during time period t2, the visible portion 2280 covers d2, d3, and d4.

In one example, using an information interpretation model, a scroll dwell time associated with a piece of content may be calculated as the total time when the piece of content keeps visible during the detection period 2032, excluding the time of scrolling. For example, as shown in FIG. 22, the scroll dwell time for d1 is t1, i.e., the time period from T0 from T1, because the visible portion 2280 does not cover d1 any more after T1. Similarly, the scroll dwell time for other pieces of content in the personalized content stream 2012 of this example may be calculated. In this example, the scroll dwell time for d2 is t1+t2; the scroll dwell time for d3 is t1+t2; the scroll dwell time for d4 is t2; the scroll dwell time for d5 is t3; the scroll dwell time for d6 is t3+t4; the scroll dwell time for d7 is t3+t4; the scroll dwell time for d8 is t4.

In case that the personalized content stream 2012 is displayed on a web page, a web beacon (web bug) may be implemented as the recording unit 2020 to track user activities on the stream of web pages. The web beacon may be an object, e.g., JavaScript, embedded on the web page. A web beacon may record a timestamp when an event happens and the position of the visible portion 2280 when an event happens. For example, referring to the above example in FIG. 22, a web beacon may include "scroll-start:(T3,2)" to record a scroll starts at time T3, when the top of the visible portion 2280 is at d2. In one situation, the web beacon may record the size of the screen and a device ID of the user device 2010. Thus, the size of the visible portion 2280 and the bottom of the visible portion 2280 at T3 may also be calculated, based on the recorded top position of the visible portion 2280. In another situation, the web beacon may directly record a position of the bottom of the visible portion 2280.

The scroll dwell time calculated based on scrolling actions of a user may imply a level of user engagement, without an explicit user activity like clicking or sharing. For example, suppose the eight pieces of content in FIG. 22 are eight summarized articles, each including a headline and an abstract. Even without any clicks on any summarized articles here, if a user dwells a long time at a certain summarized article, the user may have read both the headline and the abstract of that summarized article. If a user dwells a short time at a certain summarized article, the user may have read only the headline of that summarized article. If a user scrolls over a certain summarized article, the user may have read neither the headline nor the abstract of that summarized article. Thus, based on implicit user activities like scrolling, a level of user engagement may be estimated. It can be understood that in some examples, the implicit user activities may be combined with some explicit user activities to estimate a level of user engagement. For example, if a user dwells short after scrolling down to a summarized article, but clicks the summarized article to read the whole article, then the user may be interested in the article after reading the headline of the article.

The example in FIG. 22 illustrates a scenario when a user always scrolls down the personalized content stream 2012. In case that a user scrolls up, the scroll dwell time for a piece of content can be similarly calculated. Referring to the example in FIG. 22, if a user scrolls up to d1 at T4 2205, and scrolls down to d6, the end of the personalized content stream 2012 at T6 2207, it can be calculated that the scroll dwell time for d1 is t1+t3; the scroll dwell time for d2 is t1+t2+t3; the scroll dwell time for d3 is t1+t2+t3; the scroll dwell time for d4 is t2; the scroll dwell time for d5 is 0; the scroll dwell time for d6 is t4; the scroll dwell time for d7 is t4; and the scroll dwell time for d8 is t4.

Besides the model used in the example of FIG. 22, the information interpretation model 2053 may include other models. For example, when the visible portion 2280 covers d2, d3, and d4 for a time period t2, instead of counting t2 into the scroll dwell time for each of the three pieces of content, one third of t2 is counted into the scroll dwell time for each of d2, d3, and d4. In another example, the time of a scrolling action may also be counted into the scroll dwell time, especially when the scroll speed is low. The scroll speed may be calculated based on the timestamps and positions of the start and the stop of one scroll.

The model building/updating unit 2052 may build the information interpretation model 2053, based on past user activities collected in a user activity log database 2051 in the user engagement evaluation module 2050. The user activity log database 2051 may continuously collect user activities recorded at the user device 2010. The model building/updating unit 2052 may continuously update the information interpretation model 2053 based on updated information at the user activity log database 2051, to train the information interpretation model 2053 using machine learning algorithms. The calculated scroll dwell times may be used as learning targets for the machine learning algorithms to update the information interpretation model 2053.

The user behavior pattern analysis unit 2054 may analyze some user behavior patterns based on information obtained from the user activity detection module 2040 and the information interpretation model 2053. For example, based on one user's activities, a pattern may be determined that the user tends to dwell for long time on a certain type of content but tends to dwell shorter or skip on another type of content. In another example, based on multiple users' activities, a pattern may be determined that a certain position in the personalized content stream 2012 may have a shorter scroll dwell time than other positions, a certain position in the visible portion 2280 may have a longer scroll dwell time than other positions, or a certain type of content may tend to have a longer scroll dwell time than other types. The analyzed user behavior patterns may be used as learning targets for the machine learning algorithms to update the information interpretation model 2053, e.g., for recommending content that is appropriate with respect to a certain user's behavior pattern.

Based on the analyzed user behavior patterns and the calculated scroll dwell time, the user engagement score calculation unit 2056 may calculate a user engagement score with respect to each piece of content in the personalized content stream 2012. The user engagement score may represent a level of user engagement of with respect to the corresponding piece of content. For example, a long scroll dwell time may imply a deep user engagement and thus can be transferred to a high user engagement score. In addition, user behavior patterns may also be considered for calculating a user engagement score. For example, suppose users tend to dwell for long time at the top of the personalized content stream 2012. Then if two pieces of content have the same scroll dwell time, one piece of content located at the top of the personalized content stream 2012 may have a lower user engagement score than the other piece of content located at the bottom of the personalized content stream 2012. In another example, scrolling back and dwelling again at the same piece of content may indicate an increased engagement of a user, after the user compares the piece of content with others down the stream. The user engagement score may be calculated based on the user behavior patterns and the calculated scroll dwell time, in combination with other parameters discussed earlier, e.g., the stream depth. For example, scrolling deep down a content stream and dwelling for a long time may indicate a high user engagement for the overall content stream.

Figure 21:
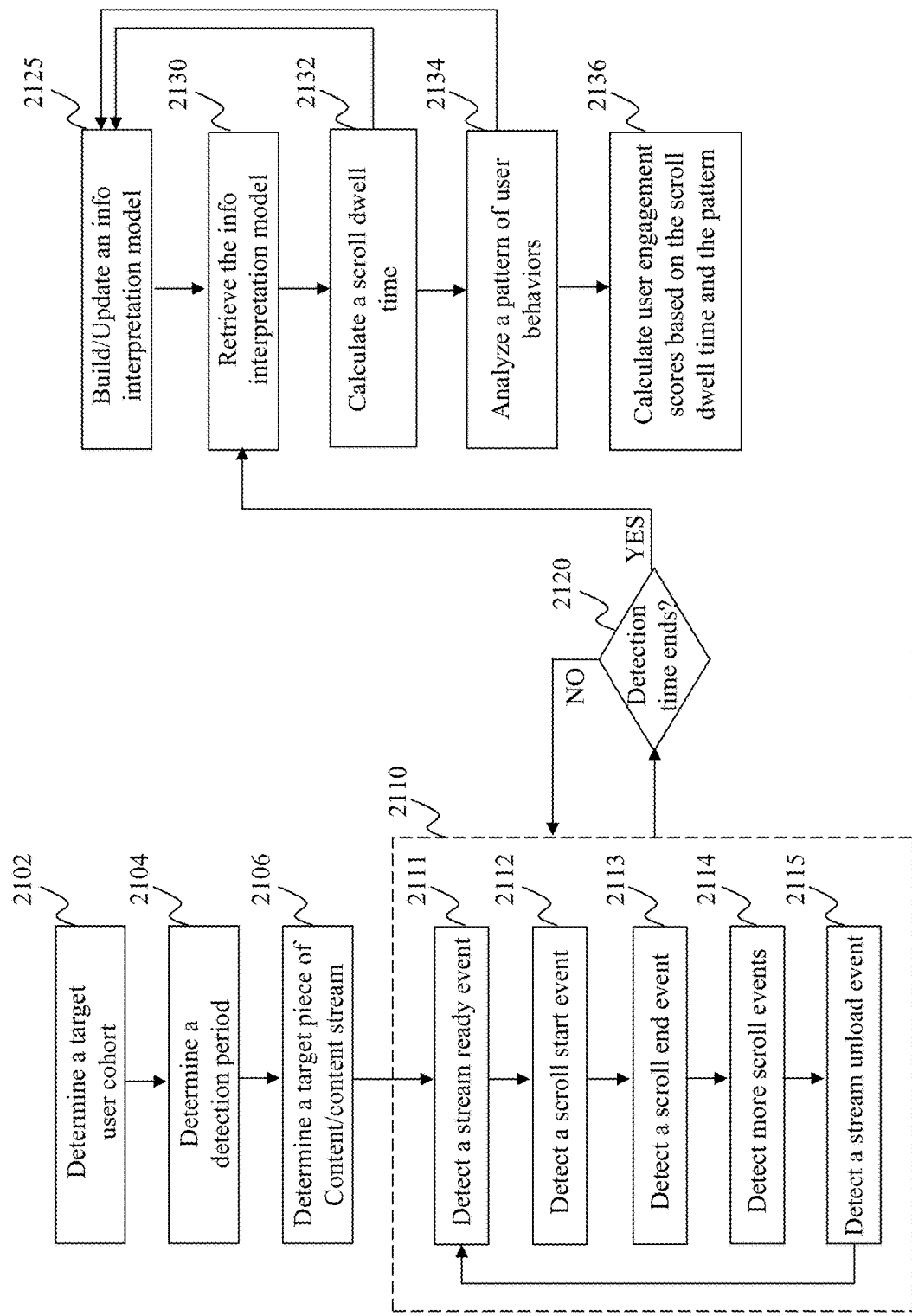
FIG. 21 is a flowchart of an exemplary process of the user engagement assessment system shown in FIG. 20, according to an embodiment of the present teaching.

FIG. 21 is a flowchart of an exemplary process for measuring user engagement, according to an embodiment of the present teaching. At 2102, a target user cohort may be determined. It can be understood that 2102 may not be necessary if the user engagement is measured for general users. At 2104, a detection period may be determined. At 2106, a target piece of content or content stream may be determined. As the user engagement scores are with respect to each piece of content in the content or the content stream itself, the target content and/or content stream may be determined first. The operations of 2102, 2104, and 2106 may be performed in serial as shown in FIG. 21, or in parallel. Then at 2110, some events may be detected within the determined detection period. The process 1010 may include, for example, detecting a stream ready event at 2111, detecting a scroll start event at 2112, detecting a scroll end event at 2113, optionally detecting more scroll events at 2114, detecting a stream unload event at 2115, detecting another stream ready event 2111, and so on. After each operation in 2110, whether the detection time has ended may be determined at 2120. If the detection time has not ended, the process 2110 may continue. Otherwise if the detection time has not ended, an information interpretation model may be retrieved at 2130.

The information interpretation model may have been built or updated at 2125, based on collected user activities or machine learning algorithms using some learning targets. The operation at 2125 may be performed continuously. At 2132, a scroll dwell time with respect to the target content or target content stream may be calculated based on the information interpretation model and the detected events at 2110. At 2134, a pattern of user behaviors with respect to the target content or target content stream may be analyzed based on the information interpretation model and the detected events at 2110. The calculated scroll dwell time at 2132 and/or the analyzed user behavior pattern at 2134 may be utilized as a learning target for training and updating the information interpretation model at 2125. The operations of 2132 and 2134 may be performed in serial as shown in FIG. 21, or in parallel. At 2136, a user engagement score may be calculated with respect to the target content or target content stream based on the scroll dwell time and the user behavior pattern.

Figure 26:
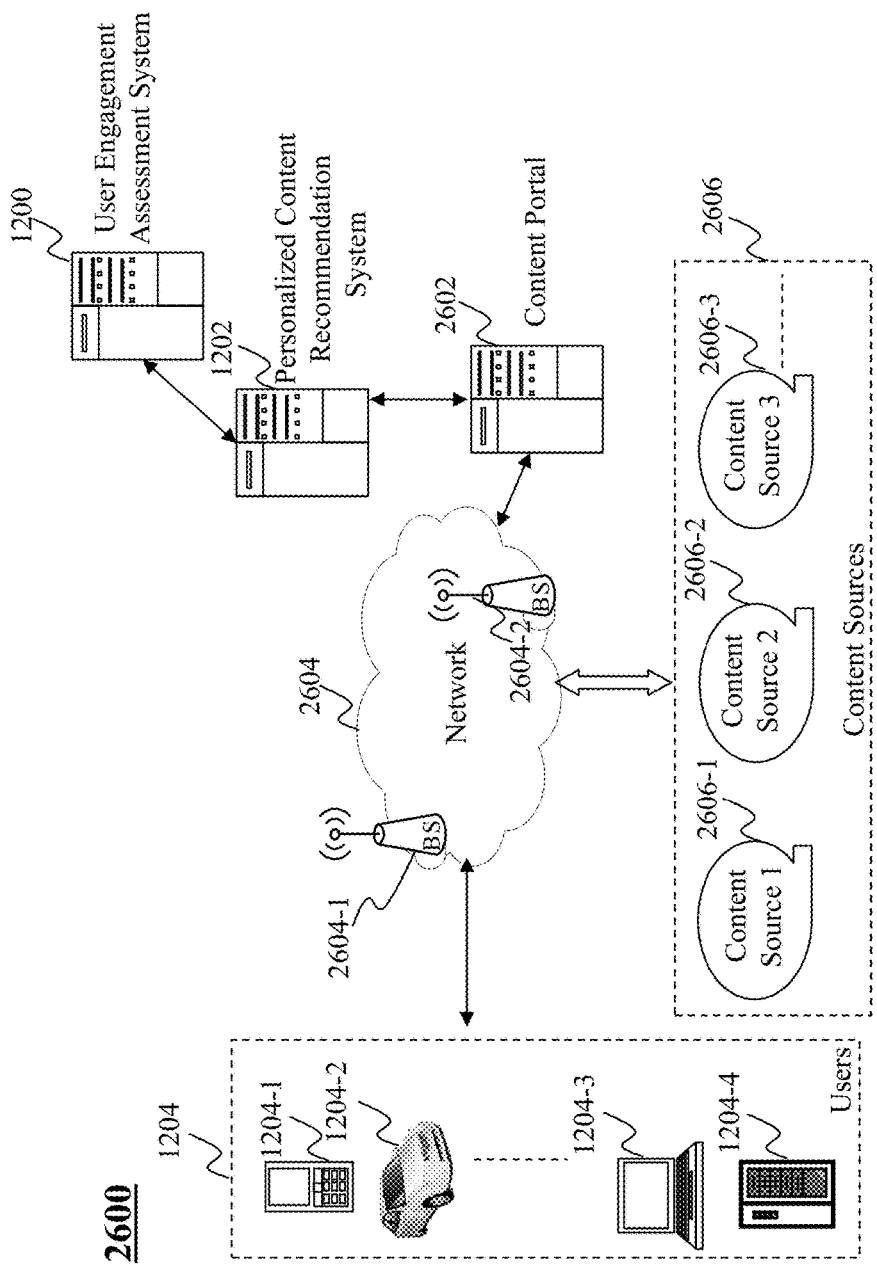
FIGS. 26-28 depict exemplary embodiments of a networked environment in which user engagement measurement is applied, according to different embodiments of the present teaching.
Figure 27:
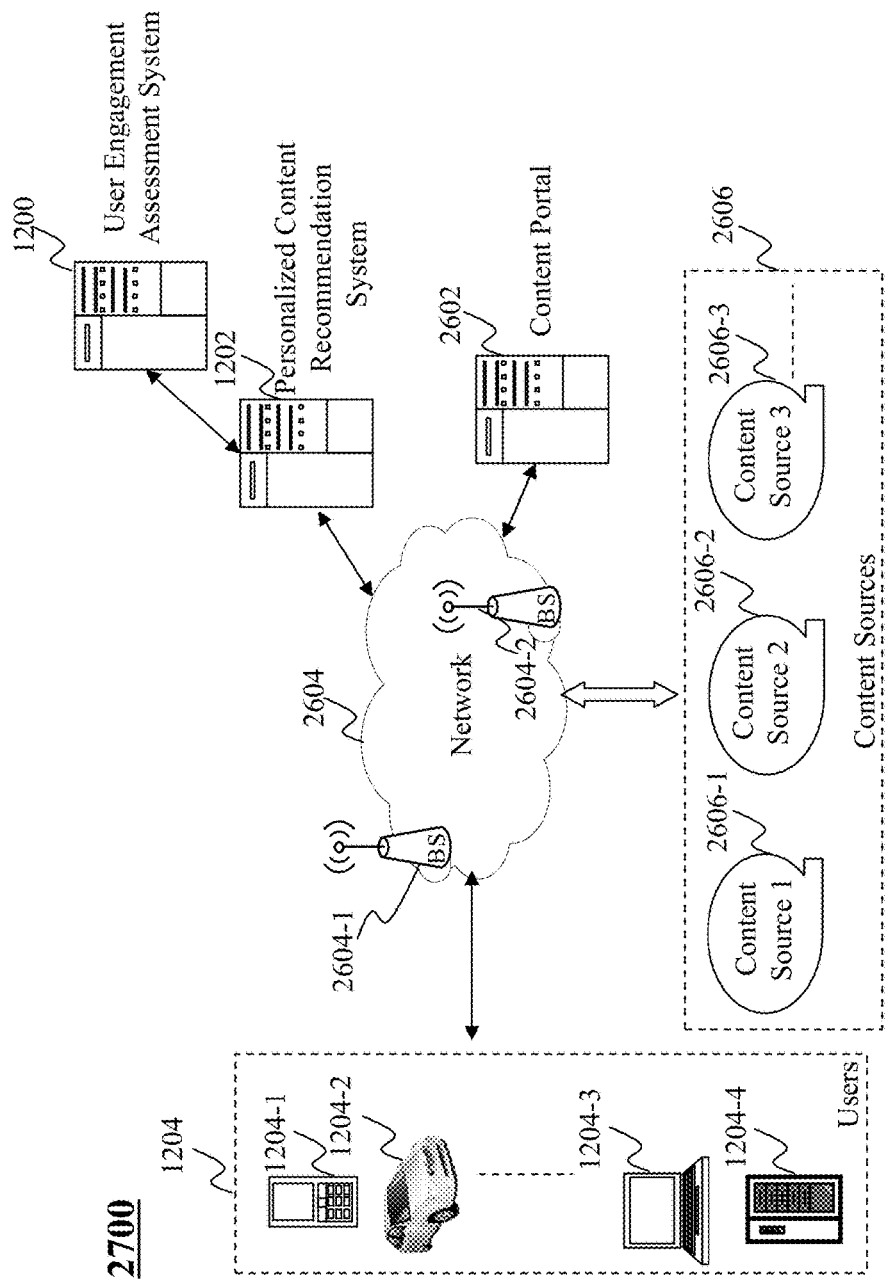
Figure 28:
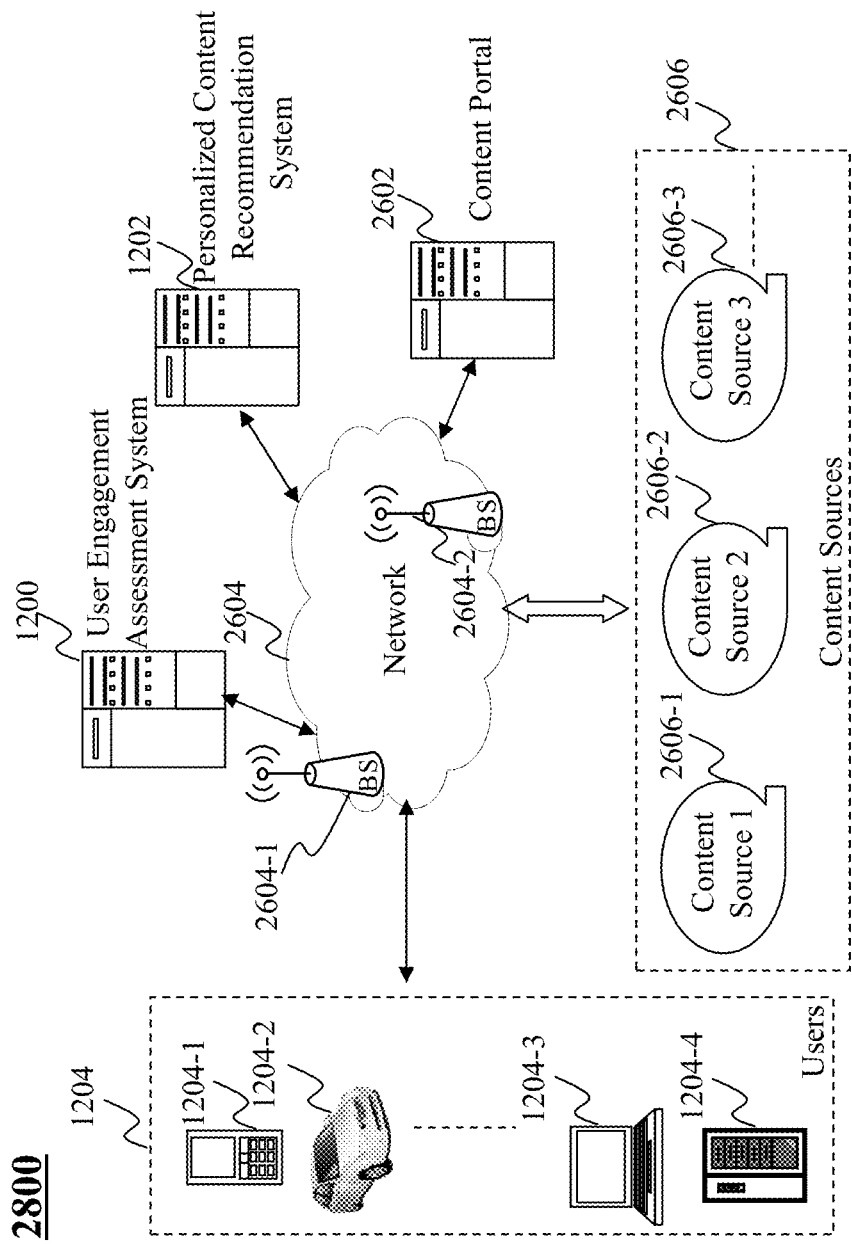

FIGS. 26-28 depict exemplary embodiments of a networked environment in which target metric identification is applied, according to different embodiments of the present teaching. In FIG. 26, an exemplary networked environment 2600 includes the user engagement assessment system 1200, the personalized content recommendation system 1202, the users 1204, a content portal 2602, a network 2604, and content sources 2606. The network 2604 may be a single network or a combination of different networks. For example, the network 2604 may be a local area network (LAN), a wide area network (WAN), a public network, a private network, a proprietary network, a Public Telephone Switched Network (PSTN), the Internet, a wireless network, a virtual network, or any combination thereof. The network 2604 may also include various network access points, e.g., wired or wireless access points such as base stations or Internet exchange points 2604-1, . . . , 2604-2, through which a data source may connect to the network 2604 in order to transmit information via the network 2604.

Users 1204 may be of different types such as users connected to the network 2604 via different user devices, for example, a desktop computer 1204-4, a laptop computer 1204-3, a mobile device 1204-1, or a built-in device in a motor vehicle 1204-2. A user 1204 may send a request and provide basic user information to the content portal 2602 (e.g., a search engine, a social media website, etc.) via the network 2604 and receive personalized content streams from the content portal 2602 through the network 2604. The personalized content recommendation system 1202 in this example may work as backend support to recommend personalized content for the user 1204 to the content portal 2602. In this example, the user engagement assessment system 1200 may also serve as backend support for the personalized content recommendation system 1202. As described before, the user engagement assessment system 1200 may calculate user engagement scores of one or more metrics, such as but not limited to, click odds, skip odds, abandon odds, stream depths, and stroll dwell times, with respect to each piece of content in a content stream and provide the user engagement scores to the personalized content recommendation system 1202

The content sources 2606 include multiple third-party content sources 2606-1, 2606-2, 2606-3. A content source may correspond to a website hosted by an entity, whether an individual, a business, or an organization such as USPTO.gov, a content provider such as cnn.com and facebook.com, or a content feed source such as Twitter or blogs. The personalized content recommendation system 1202 may access any of the content sources 2606-1, 2606-2, 2606-3 to obtain information related to the users 1204 to construct user profiles and/or collect content to build its content pool. For example, the personalized content recommendation system 1202 may fetch content, e.g., websites, through its crawler.

FIG. 27 presents a similarly networked environment as what is shown in FIG. 26 except that the personalized content recommendation system 1202 is configured as an independent service provider that interacts with the users 1204 directly to provide personalized content recommendation service. In the exemplary networked environment 2700, the personalized content recommendation system 1202 may receive a request with some basic information from a user 1204 and provide personalized content streams to the user 104 directly without going through a third-party content portal 2602.

FIG. 28 presents a similarly networked environment as what is shown in FIG. 27 except that the user engagement assessment system 1200 in the exemplary networked environment 2800 is also configured as an independent service provider to provide user engagement measurement service for personalized content recommendation.

Figure 29:
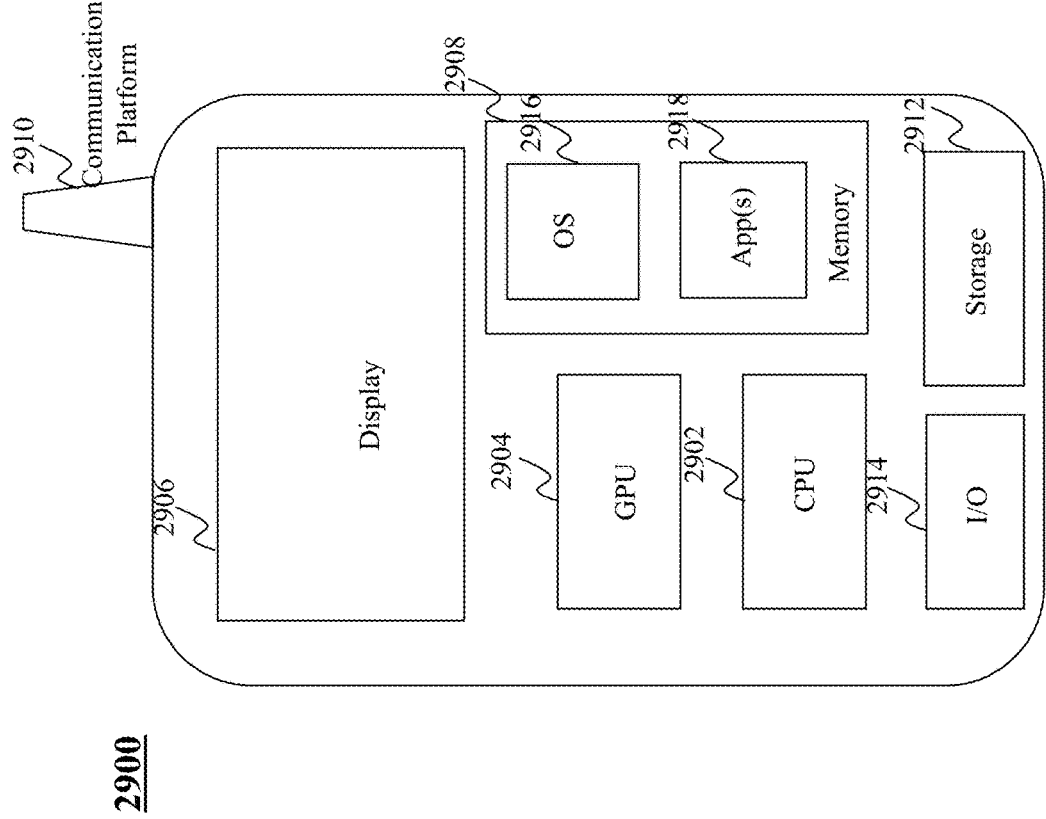
FIG. 29 depicts a general mobile device architecture on which the present teaching can be implemented.

FIG. 29 depicts a general mobile device architecture on which the present teaching can be implemented. In this example, the user device on which personalized content is presented is a mobile device 2900, including but is not limited to, a smart phone, a tablet, a music player, a handled gaming console, a global positioning system (GPS) receiver. The mobile device 2900 in this example includes one or more central processing units (CPUs) 2902, one or more graphic processing units (GPUs) 2904, a display 2906, a memory 2908, a communication platform 2910, such as a wireless communication module, storage 2912, and one or more input/output (I/O) devices 2914. Any other suitable component, such as but not limited to a system bus or a controller (not shown), may also be included in the mobile device 2900. As shown in FIG. 29, a mobile operating system 2916, e.g., iOS, Android, Windows Phone, etc., and one or more applications 2918 may be loaded into the memory 2908 from the storage 2912 in order to be executed by the CPU 2902. The applications 2918 may include a browser or any other suitable mobile apps for receiving and rendering personalized content streams on the mobile device 2900. Execution of the applications 2918 may cause the mobile device 2900 to perform the processing as described above, e.g., in FIGS. 26-28. For example, the display of personalized content to the user may be made by the GPU 2904 in conjunction with the display 2906. User interactions with the personalized content streams may be achieved via the I/O devices 2914 and provided to user engagement assessment system 1200 via the communication platform 2910.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 30:
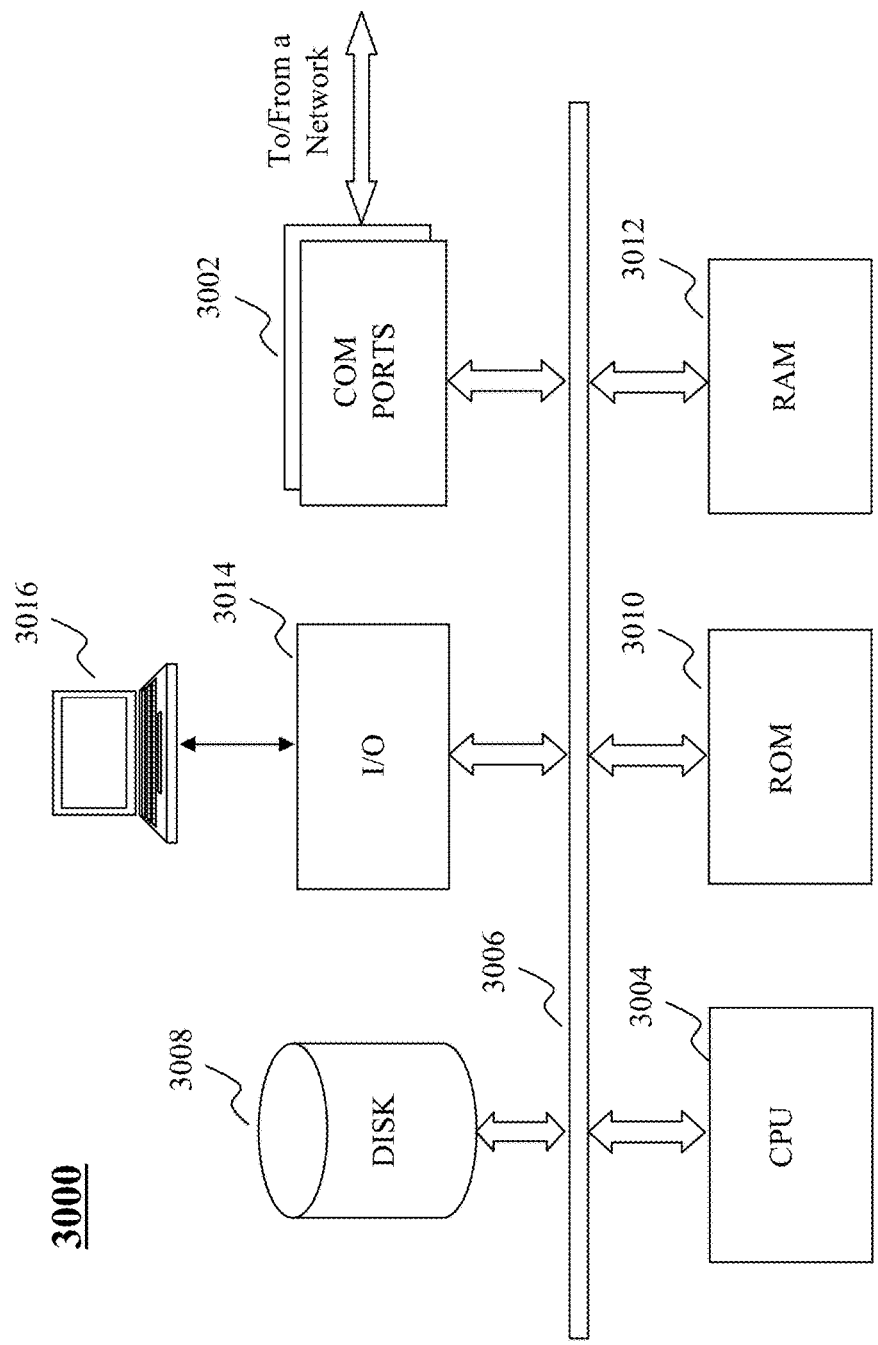
FIG. 30 depicts a general computer architecture on which the present teaching can be implemented.

FIG. 30 depicts a general computer architecture on which the present teaching can be implemented and has a functional block diagram illustration of a computer hardware platform that includes user interface elements. The computer may be a general-purpose computer or a special purpose computer. This computer 3000 can be used to implement any components of the user engagement measurement architecture as described herein. Different components of the system in the present teaching can all be implemented on one or more computers such as computer 3000, via its hardware, software program, firmware, or a combination thereof. Although only one such computer is shown, for convenience, the computer functions relating to the target metric identification may be implemented in a distributed fashion on a number of similar platforms, to distribute the processing load.

The computer 3000, for example, includes COM ports 3002 connected to and from a network connected thereto to facilitate data communications. The computer 3000 also includes a central processing unit (CPU) 3004, in the form of one or more processors, for executing program instructions. The exemplary computer platform includes an internal communication bus 3006, program storage and data storage of different forms, e.g., disk 3008, read only memory (ROM) 3010, or random access memory (RAM) 3012, for various data files to be processed and/or communicated by the computer, as well as possibly program instructions to be executed by the CPU. The computer 3000 also includes an I/O component 3014, supporting input/output flows between the computer and other components therein such as user interface elements 3016. The computer 3000 may also receive programming and data via network communications.

Hence, aspects of the method of measuring user engagement, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine, each of which has at least one processor, storage, and a communication platform connected to a network for identifying content to recommend to a user, the method comprising the steps of:

displaying a content stream including a plurality of pieces of content on a device operated by the user;

obtaining by a processor, for each piece of content and an associated user operation of a plurality of user operations, a corresponding probability of occurrence of the user operation on the piece of content, the probability of occurrence being computed based on one or more parameters associated with the displaying and a speed and/or acceleration of scrolling the content stream;

detecting by the processor, for each displayed piece of content, an actual occurrence of at least one operation of the plurality of operations;

computing, for each piece of content, a first score associated with an amount of time the piece of content is displayed, the first score being computed based on a relative display position of the piece of content with respect to a reference piece of content;

calculating, for each piece of content, an engagement score based on the probability of occurrence of the at least one operation being performed on the piece of content, the actual occurrence of the at least one operation being detected, the first score, and a stream depth of the content stream;

assigning, for each piece of content, a rank based on the calculated engagement score of the piece of content; and identifying the content to be recommended to the user, the content being identified based on the assigned rank of the each piece of content.

2. The method of claim 1, wherein the user operation is one of clicking a piece of the plurality pieces of content, skipping one or more pieces of the plurality pieces of content, and abandoning at least some of the plurality pieces of content.

3. The method of claim 1, wherein the one or more parameters associated with the displaying include at least one of
a display position of the piece of content, a presentation style of the piece of content, and a type of information included in the piece of content.

4. The method of claim 1, wherein the identified content is recommended to the user in real time.

5. The method of claim 1, wherein the first score is computed based on a type of device operated by the user.

6. A system for identifying content to recommend to a user, the system comprising:

at least one processor configured to:

display a content stream including a plurality of pieces of content on a device operated by the user;

obtain for each piece of content and an associated user operation of a plurality of user operations, a corresponding probability of occurrence of the user operation on the piece of content, the probability of occurrence being computed based on one or more parameters associated with the displaying and a speed and/or acceleration of scrolling the content stream;

detect, for each displayed piece of content, an actual occurrence of at least one operation of the plurality of operations;

compute, for each piece of content, a first score associated with an amount of time the piece of content is displayed, the first score being computed based on a relative display position of the piece of content with respect to a reference piece of content;

calculate, for each piece of content, an engagement score based on the probability of occurrence of the at least one operation being performed on the piece of content, the actual occurrence of the at least one operation being detected, the first score, and a stream depth of the content stream;

assign, for each piece of content, a rank based on the calculated engagement score of the piece of content; and identify the content to be recommended to the user, the content being identified based on the assigned rank of the each piece of content.

7. The system of claim 6, wherein the user operation is one of clicking a piece of the plurality pieces of content, skipping one or more pieces of the plurality pieces of content, and abandoning at least some of the plurality pieces of content.

8. The system of claim 6, wherein the one or more parameters associated with the displaying include at least one of: a display position of the piece of content, a presentation style of the piece of content and a type of information included in the piece of content.

9. The system of claim 6, wherein the identified content is recommended to the user in real time.

10. A non-transitory machine-readable medium having information recorded thereon for recommending content, wherein the information, when read by a machine, causes the machine to perform the following:

displaying a content stream including a plurality of pieces of content on a device operated by the user;

obtaining, for each piece of content and an associated user operation of a plurality of user operations, a corresponding probability of occurrence of the user operation on the piece of content, the probability of occurrence being computed based on one or more parameters associated with the displaying and a speed and/or acceleration of scrolling the content stream;

detecting, for each displayed piece of content, an actual occurrence of at least one operation of the plurality of operations;

computing, for each piece of content, a first score associated with an amount of time the piece of content is displayed, the first score being computed based on a relative display position of the piece of content with respect to a reference piece of content;

calculating, for each piece of content, an engagement score based on the probability of occurrence of the at least one operation being performed on the piece of content, the actual occurrence of the at least one operation being detected, the first score, and a stream depth of the content stream;

assigning, for each piece of content, a rank based on the calculated engagement score of the piece of content; and identifying the content to be recommended to the user, the content being identified based on the assigned rank of the each piece of content.

11. The medium of claim 10, wherein the user operation is one of clicking a piece of the plurality pieces of content, skipping one or more pieces of the plurality pieces of content, and abandoning at least some of the plurality pieces of content.

12. The medium of claim 10, wherein the one or more parameters associated with the displaying include at least one of a display position of the piece of content, a presentation style of, piece of content, and a type of information included in the piece of content.

* * * * *